United States Patent [19]
Efron

[11] Patent Number: 4,689,683
[45] Date of Patent: Aug. 25, 1987

[54] COMPUTERIZED STUDIO FOR MOTION PICTURE FILM AND TELEVISION PRODUCTION

[76] Inventor: Edward Efron, 10 Allegheny, Irvine, Calif. 92720

[21] Appl. No.: 840,947

[22] Filed: Mar. 18, 1986

[51] Int. Cl.$^4$ .................... H04N 5/222; H04N 5/262
[52] U.S. Cl. .................................. 358/185; 358/181; 358/903; 370/124
[58] Field of Search ............... 358/185, 210, 181, 903, 358/86; 455/6; 370/85, 86, 88, 124

[56] References Cited

U.S. PATENT DOCUMENTS

| | | | |
|---|---|---|---|
| 3,828,319 | 8/1974 | Owen et al. | 358/903 |
| 4,222,854 | 3/1982 | Bundens et al. | 455/6 |
| 4,337,480 | 6/1982 | Bourassin et al. | 358/93 |
| 4,488,179 | 12/1984 | Krüger et al. | 358/181 |
| 4,649,428 | 3/1987 | Jones et al. | 358/903 |

FOREIGN PATENT DOCUMENTS 0123245  7/1983  Japan .................................. 358/210

*Primary Examiner*—Howard W. Britton
*Assistant Examiner*—John K. Peng
*Attorney, Agent, or Firm*—Roy A. Ekstrand

[57] ABSTRACT

A computerized motion picture film and television studio includes a pair of concurrent local area networks. The first local area network communicates digital information and the second communicates analog information over a plurality of assigned channel frequencies. A plurality of information processing devices, including a camera station, transfer video and audio information via the multi-channel analog local area network under the direction of a central control computer.

10 Claims, 16 Drawing Figures

COMPUTERIZED STUDIO FOR MOTION PICTURE FILM AND TELEVISION PRODUCTION

BACKGROUND OF THE INVENTION (1) Field of the Invention

This invention relates generally to motion picture film and television production and particularly to motion picture film and television production carried forward within a production studio.

(2) Prior Art

The majority of entertainment available to the consumer today has its origins in what would now be called live presentations in which performers undertake their entertainment activities in the presence and in front of a viewing audience. This form of entertainment appears to have been present in even the earliest of societies. During the last century, a significant change in entertainment presentation occurred with the advent of motion picture filming, causing the entertainment industry to branch into live presentation on the one hand, and filmed presentation on the other hand. As is known, the film branch of the entertainment industry grew dramatically within the last century and in many minds, actually eclipsed the original live performance branch of the industry. Because the dramatic growth in film entertainment was accompanied by a period of intense technology development, the film industry rapidly grew in sophistication of cinemagraphic arts. Various film techniques were developed by which the entertainment value and drama of the presentation could be increased. The majority of these mechanisms were categorized as "special effects" and included, initially, the use of miniature models to depict larger than life story components, such as large animals, monsters, robots, etc. Among the film techniques for providing such special effects, a technique known as the "blue screen process" evolved, which permitted the separate filming of background and foreground information with the two separate components being combined in a cinematography process. Generally speaking, the background information comprised the portions of the presentation which would generally be perceived by the viewer as the surrounding scene, while the foreground information comprised the content which would normally be described by the viewer as the performers and objects intimately involved with the performers. While the proper implementation of the blue screen process is one of sophistication and complexity, a sufficient understanding may be gleamed by describing the process as one in which a selected color, in this case blue, is designated within the process to be "invisible" and the remainder of the filming process is adapted to ignore objects which are blue. The process is then carried forward in a manner in which the foreground objects are photographed against background which is blue in the portion of scene content for which the background scene elements will be substituted. In its simplest form and by way of example, a blue screen process within a studio can be carried forward in which an entertainer appears before a blank blue wall and goes through various acting and performance activities. Simultaneously, a background film is created having an outdoor scene and two portions of film are combined by the blue screen process, producing a product in which the actors activities are seen displayed against the outdoor background giving the appearance of an outdoor activity.

While such blue screen processes were initially embraced by the film industry as methods of circumventing obstacles in film production, such as the need within the story line for a five story tall monster to appear or an actor in a science fiction film to appear in a futuristic environment which could not be created by set builders, it soon became apparent to film producers that the blue screen process might offer at least a partial alternative to the expense of filming the majority of the motion picture.

It should be noted that during this time of increasing technology and dramatic film growth, there was an accompanying increase in the cost of film production. As consumers demanded more and more sophisticated films and stopped being entertained by the mere existence of moving figures on the screen, increased pressure upon film producers for realism and dramatic effect in their films, caused them frequently to undertake substantial and expensive construction projects to build life-size sets for film production. Additionally, the consumer demands for realism and drama caused producers to begin filming their productions "on location" as opposed to the previously used studio back lots. The on location filming, as the name implies, required bundling up the entire movie company and transporting them to the local in which the filmed story is set. For example, the filming of a story set in Egypt would require bundling up the entire movie company, or a substantial portion of it, and transporting them to the appropriate location within the nation of Egypt. As can be imagined, this on location filming is extremely expensive and subject to considerable risks as more and more exotic film locations are demanded. Similarly, the costs of building life size movie sets to avoid on location filming also became extremely time consuming and expensive. Movie sets had the additional problem that they generally were not reuseable in many films and therefore represented a substantial cost in movie production. The extremely high costs of life-size set production and the similar high costs and accompanying hazards of on location filming caused film producers to reexamine the various technology processes which had during this time evolved, primarily in the special effects areas such as the blue screen process, as more than special effects but perhaps alternatives to both life-size set building and on location shooting.

Of the various techniques available, the cinematography blue screen process provided some potential for reduction of film producing costs in that some scene portions could be filmed within a studio and later combined with appropriate background information. The advantages of such blue screen processing the cost facet of production were substantial and film producers exercised their creativity in adapting story lines and other elements of film production to maximize the use of blue screen technology.

Unfortunately, the blue screen process is subject to several substantial limitations and has not as yet provided the desired alternative to high cost on location or life size movie set filming. For example, the blue screen process employed on film is an iterative process in which the end product or combined film is not viewable for evaluation until the entire process has been completed. As a result, and because it is difficult to control the end product during the filming of the individual scene portions, film producers frequently view the end product or combined film and require changes to either or both foreground and background film requiring that they "reshoot" either or both under different conditions and repeat the entire process evaluating the end result. Because the process includes variations which make compensation difficult and the effect on end product uncertain, the normal cycle for blue screen film production involves several iterations of this process. As a result, the blue screen process becomes extremely expensive in itself and often does not provide the desired lower cost alternative to the other filming methods.

The advent and growth of the color television entertainment industry developed in a similar manner to film production and soon became a competing art form to classic film production. During this growth period of color television production, art forms which would otherwise have been produced on film, have instead been produced within television studios and stored on video tape rather than film. As was the case in the growth of the film industry, the television entertainment producers soon discovered the same economics applied to them and they too embraced various technology alternatives, including the blue screen process. In the television or "video" format, the blue screen process iterations may be carried forward without the extensive time loss experienced by the film process. The video format offers the opportunity to examine the end product or combined foreground and background tape very quickly because, unlike film, video tape does not require a developing period. Unfortunately, the television industry is directed to the production of works which are eventually broadcast or transmitted to television receivers. As a result, the quality of image and resolution capabilities of the television production products is substantially less than that provided by the film industry.

As the film and television industries continue to grow, considerable interaction between them has resulted in various efforts to combine the two technologies and produce works which take advantage of the advantages each system provides. There exist in the art, for example, devices which convert image information stored on motion picture film to image information stored on video tape. There also exists devices which provide the reverse conversion of video tape to film. Despite the best efforts however, the two systems remain substantially incompatible and the practitioners of the art have not yet provided a method of production which makes use of the advantages of each respective technology. There remains therefore, a need in the art for a method of motion picture and television entertainment production which utilizes the advantages of the two technologies and provides for their ready combination in a efficient and creative manner.

SUMMARY OF THE INVENTION

It is a generally object therefore, to provide an improved facility for the production of motion picture and television entertainment. It is a more particular object of the present invention to provide such improved motion picture and television entertainment production in a manner which also provides substantial reductions of production cost and increased efficiency and speed of production. It is a still more particular object of the present invention to provide such improved production of film and television entertainment in a manner in which the costs associated with the construction of life-size movie sets and on location production are avoided.

In accordance with the invention there is provided a digital Local Area Network and an analog Local Area Network and a master computer. A interface controller couples the master computer to the digital local area network and the analog Local Area Network. The master computer includes an associated memory and stored set of program instructions in accordance with which it establishes various operating protocols and access priorities under which information may be placed upon or retrieved from the digital and analog local area networks. A plurality of peripheral devices each include respective interface controllers coupling them to the digital Local Area Network and the analog Local Area Network. Means are provided by which the peripheral devices under control of the master computer may be caused to place image or other relevant information upon either the digital or analog Local Area Network or retrieve information therefrom. Means are further provided for uniquely identifying each portion of image information transmitted within the Local Area Networks and for relating and storing other relevant information thereto.

BRIEF DESCRIPTION OF THE DRAWINGS

The features of the present invention which are believed to be novel are set forth with particularity in the appended claims. The invention, together with further objects and advantages thereof, may be best understood by reference to the following description taken in conjunction with the accompanying drawings in the several figures of which like reference numerals identify like elements and in which:

DESCRIPTION OF THE INVENTION

Figure 1:
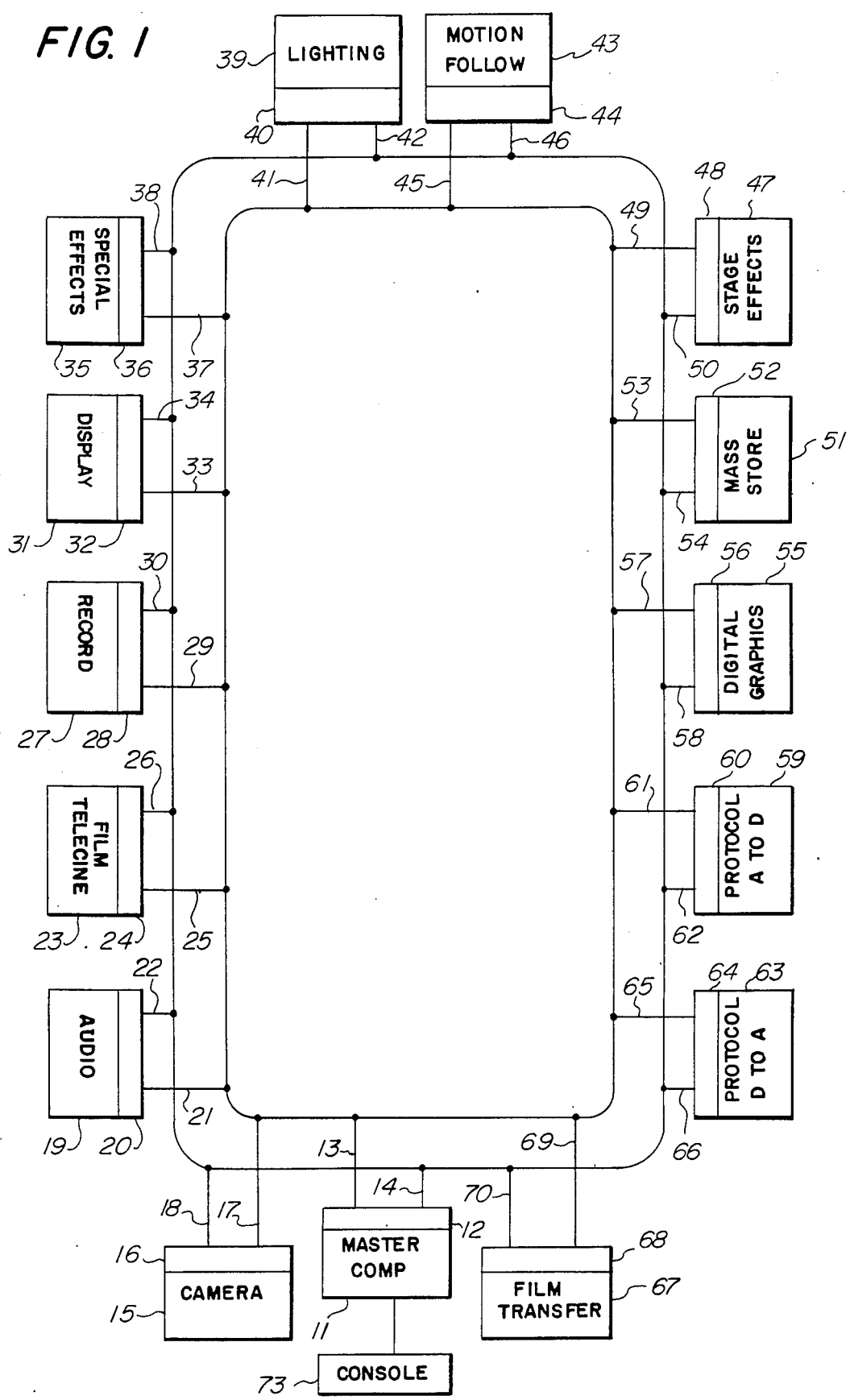
FIG. 1 is a block diagram representation of a computerized film and television production studio constructed in accordance with the present invention.
Figure 3:
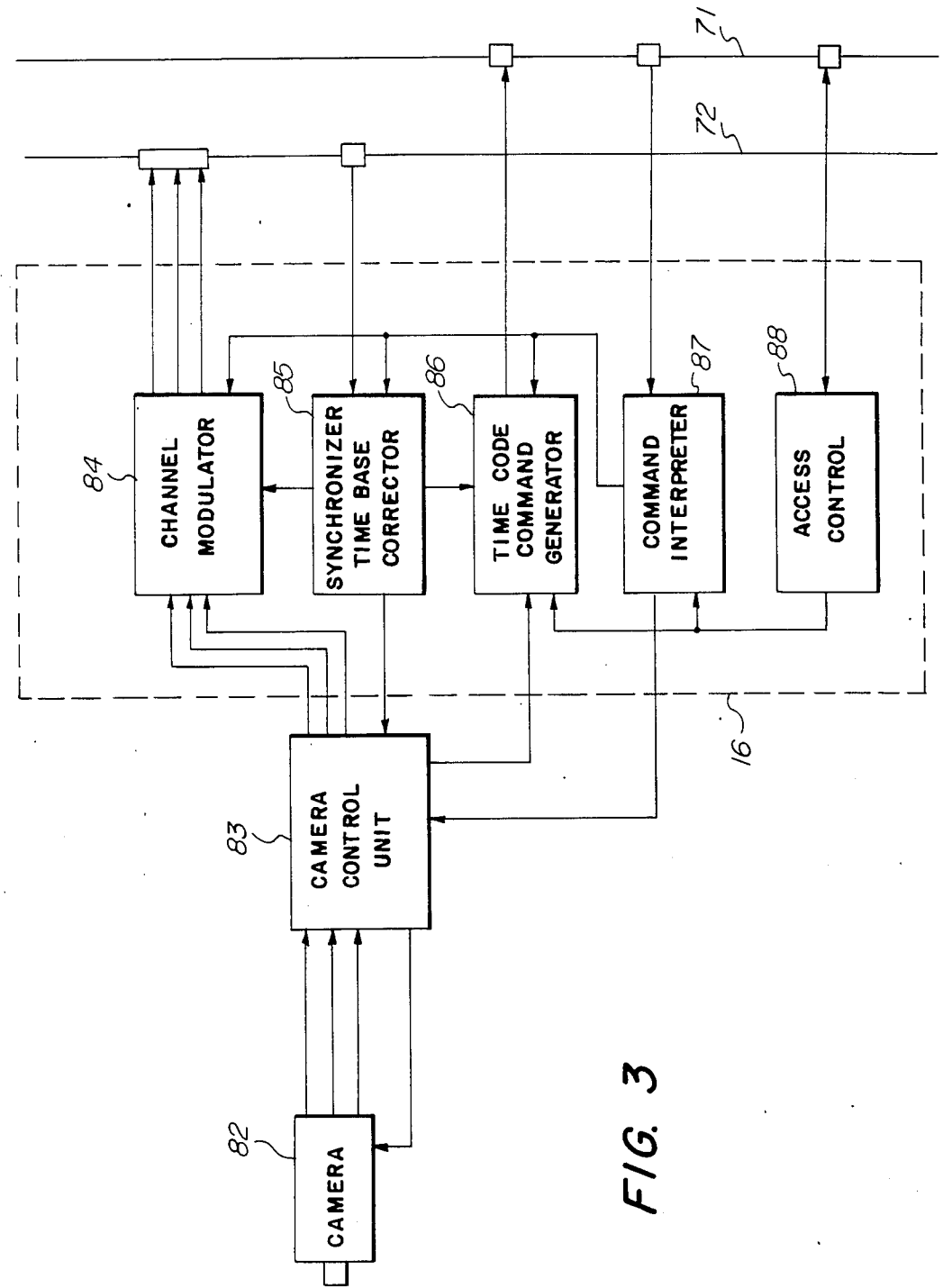
FIG. 3 is a block diagram representation of a camera station stage of the present invention.
Figure 4:
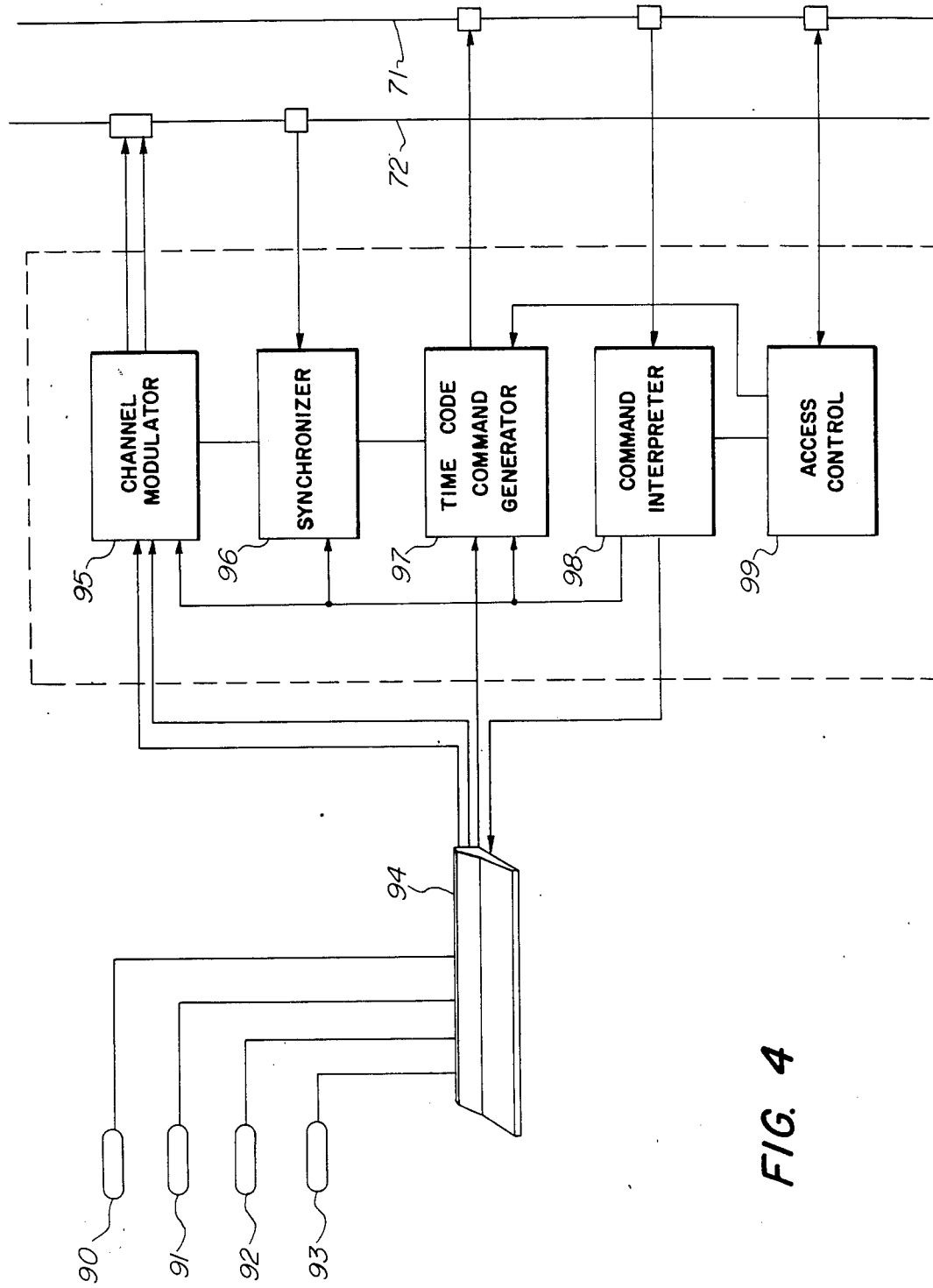
FIG. 4 is a block diagram representation of an audio station constructed in accordance with the present invention.
Figure 6:
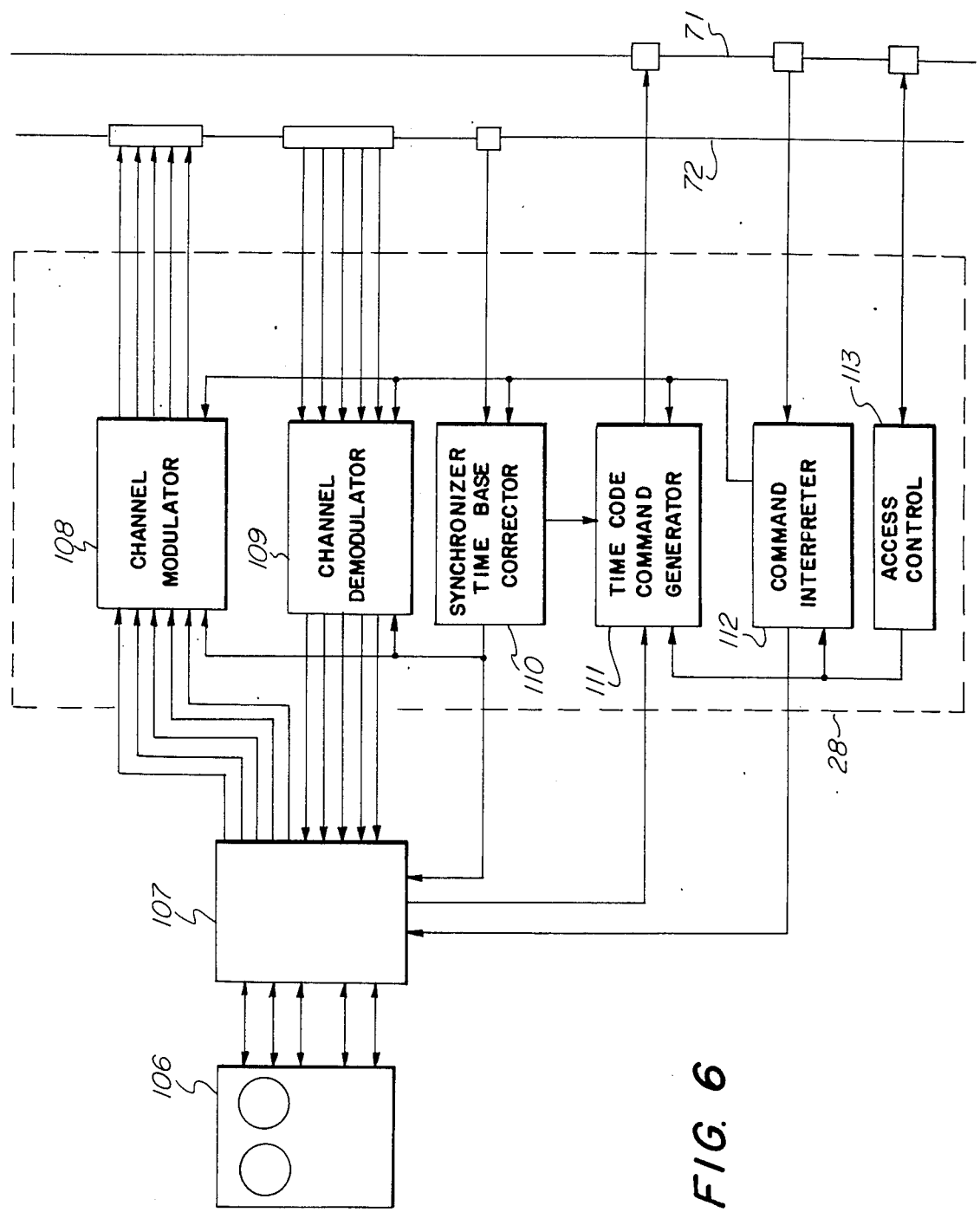
FIG. 6 is a block diagram representation of a recorder station constructed in accordance with the present invention.
Figure 7:
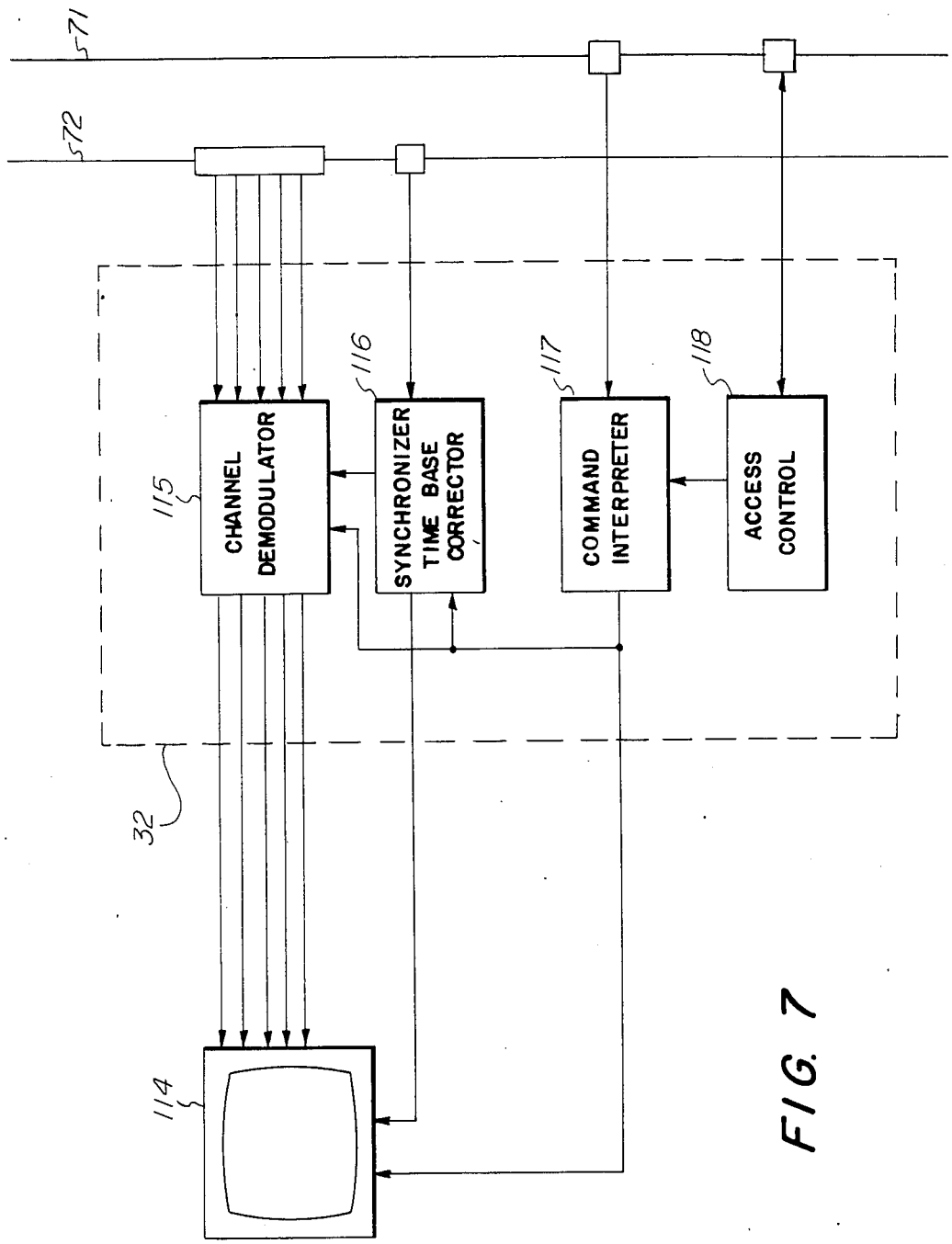
FIG. 7 is a block diagram representation of a display station constructed in accordance with the present invention.
Figure 8:
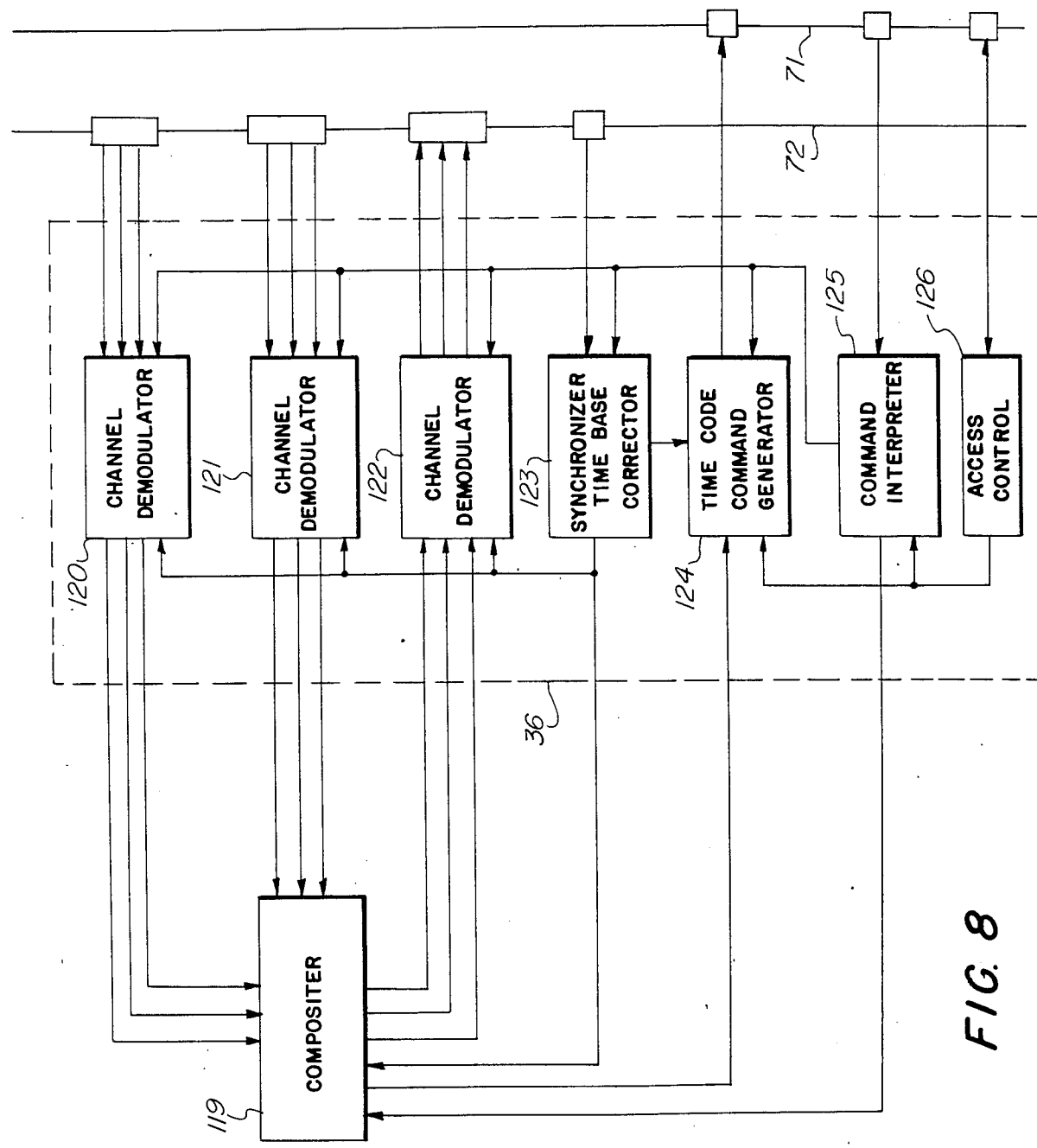
FIG. 8 is a block diagram representation of a special effects station constructed in accordance with the present invention.
Figure 9:
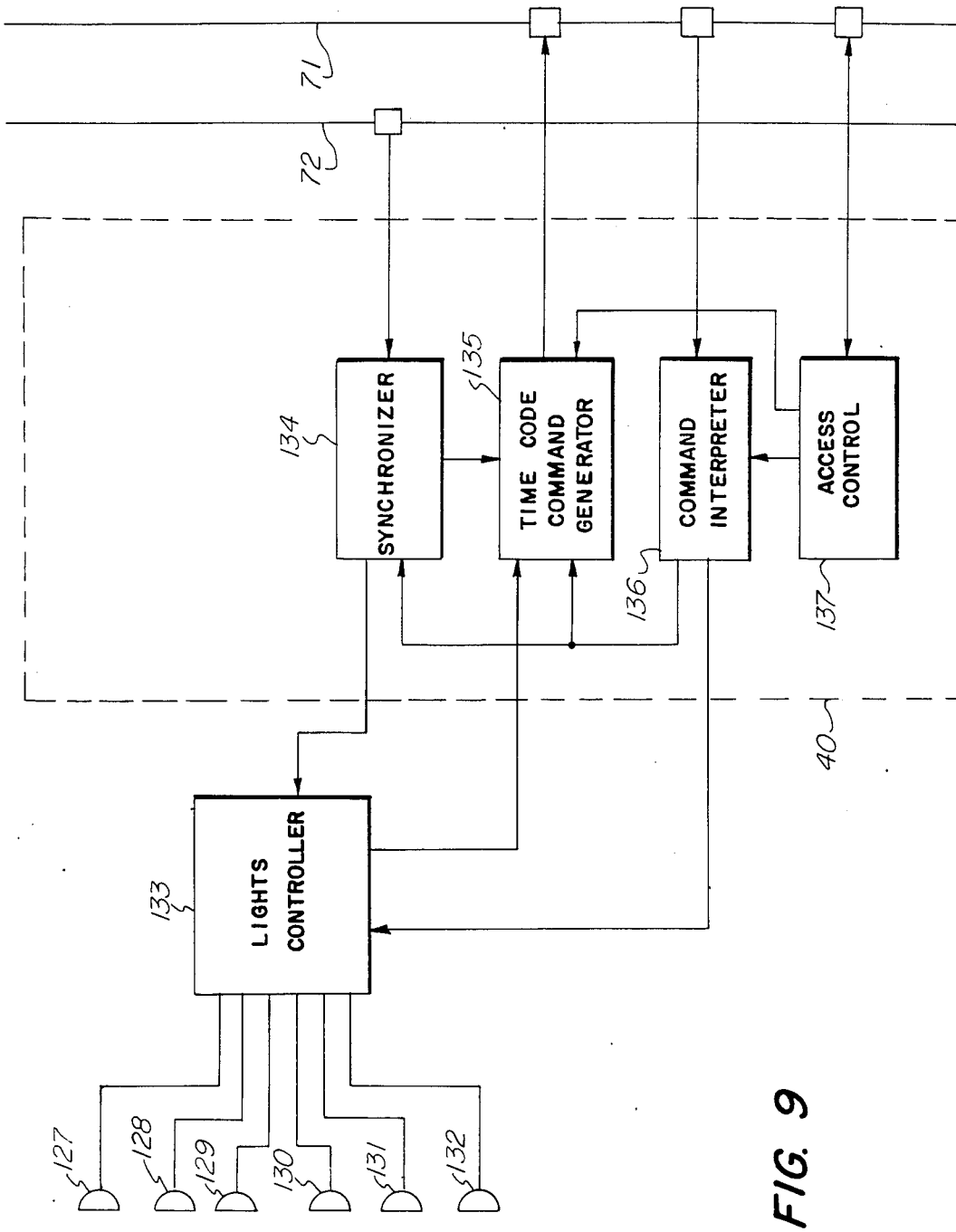
FIG. 9 is a block diagram representation of a lighting station constructed in accordance with the present invention.

FIG. 1 sets forth a block diagram of the motion picture film and television studio system constructed in accordance with the present invention in which a digital or base band Local Area Network (LAN) 71 and a broad band analog Local Area Network (LAN) 72 are arranged in a parallel pair of circuits. A master computer 11 and a interface 12 are intercoupled in a manner shown in more detail in FIG. 2. Interface 12 is coupled to digital LAN 71 by a coupling 13 and to analog LAN 72 by a coupling 14. A camera station 15 having an interface 16, the details of which are shown more clearly in FIG. 3, is coupled to digital LAN 71 by a coupling 17 and to analog LAN 72 by a coupling 18. An audio station 19 and an interface 20, the details of which are shown more clearly in FIG. 4, is coupled to digital LAN 71 by a coupling 21 and to analog LAN 72 by a coupling 22. A film telecine station 23 is coupled to an interface 24, the details of which are shown more clearly in FIG. 5. Interface 24 is coupled to digital LAN 71 by a coupling 25 and to analog LAN 72 by a coupling 26. A recorder station 27 and interface 28, the details of which are shown more clearly in FIG. 6, is coupled to digital LAN 71 by a coupling 29 and to analog LAN 72 by a coupling 30. A display station 31 and an interface 32, the details of which are shown more clearly in FIG. 7, is coupled to digital LAN 71 by a coupling 33 and to analog LAN 72 by a coupling 34. A special effects station 35 and an interface 36, the details of which are shown more clearly in FIG. 8, is coupled to digital LAN 71 by a coupling 37 and to analog LAN 72 by a coupling 38. A lighting station 39 and a interface 40, the details of which are shown more clearly in FIG. 9, are coupled to digital LAN 71 by a coupling 41 and to analog LAN 72 by a coupling 42. A motion following stage 43 has an interface 44, the details of which are shown more clearly in FIG. 10, coupled to digital LAN 71 by a coupling 45 and to analog LAN 72 by a coupling 46. A special effects motion station 47 has an interface 48, the details of which are shown more clearly in FIG. 11, coupled to digital LAN 71 by a coupling 49 and to analog LAN 72 by a coupling 50. A mass storage library 51 has an interface 52, the details of which are shown more clearly in FIG. 12, coupled to digital LAN 71 by coupling 53 and to analog LAN 72 by coupling 54. A digital graphics station 55 has an interface 56, the details of which are shown more clearly below in FIG. 13, coupled to digital LAN 71 by a coupling 57 and to analog LAN 72 by a coupling 58. An analog to digital protocol conversion station 59 has an interface 60, the details of which are set forth below in FIG. 14, coupled to digital LAN 71 by a coupling 61 and to analog LAN 72 by a coupling 62. A digital to analog protocol conversion station 63 has an interface 64, the details of which are shown below in FIG. 15, coupled to digital LAN 71 by a coupling 66 and to analog LAN 72 by a coupling 65. A film transfer station 67 has an interface 68, the details of which are shown below in FIG. 16, coupled to digital LAN 71 by a coupling 69 and to analog LAN 72 by a coupling 70.

In operation, digital LAN 71 comprises a single channel base band local area network suitable for transmitting digital information while analog LAN 72 is a broad band Local Area Network capable of simultaneous transmission of a plurality of carrier frequency signals, each assigned to a specific channel frequency whereby simultaneous transmission of analog information may be carried forward on analog LAN 72. As an overview to the descriptions which follow, it should be understood by those skilled in the art that the basic format of operation of the interrelated digital LAN and analog LAN system set forth in FIG. 1 and the figures which follows, provides in essence that each of the various peripheral devices coupled to digital LAN 71 and analog LAN 72 are coupled and interfaced in a manner whereby each station is always simultaneously capable of receiving whatever information is present on digital LAN 71 and analog LAN 72. The completion of transmission of any specific portion of information through the interface of a peripheral device is accomplished by the coded information placed upon digital LAN 71 by master computer 11 which by means set forth below causes a particular peripheral device or group of peripheral devices to accept or receive the information then present on analog LAN 72 and/or digital LAN 71. The protocols set forth below provided that information relating to image content, audio content, or associated relevant scene construction information may be transmitted using digital LAN 71 as directed by master computer 11.

Simply stated, each peripheral device is also "listening" to both digital LAN 71 and analog LAN 72. The process by which any given peripheral device or group of peripheral devices "hears" or receives information is carried forward under master computer control.

This situation with respect to information applied to digital LAN 71 or analog LAN 72 by the peripheral devices is however essentially the converse, the access of any given peripheral device to the LAN in terms of applying information to either digital LAN 71 or analog LAN 72 is determined by an established access system or hierarchy. Master computer 11 provides peripheral device access to analog LAN 72. As to digital LAN 71, access is provided in accordance with either of two criteria. In the first system access is sequentially afforded each of the peripheral devices about LAN 71. While no particular order or sequence is mandated, in its simplest form for example, this sequential access, often referred to as "passing the token", is carried forward in the system of FIG. 1 by presenting the opportunity to access digital LAN 71 first to camera stage 15 then to audio station 19, then film telecine station 23 and so on, about the loop finishing with film transfer station 67 and thereafter to master computer 11 and finally returning to camera station 15 and repeating the process. This passing of access to LAN 71 can be carried forward on a continuous basis resulting in time share capability and access to the digital LAN 71. In the second access system, each device having information to impart to digital LAN 71 attempts to access the LAN and if "busy" the LAN is monitored until not busy and the device then transmits. In the event two or more devices simultaneously transmit a phenomenon known as "collision" takes place and each device withdraws and waits a random time interval and attempts again to transmit.

While the individual functions of the peripheral devices shown in in FIG. 1 will be described below in greater detail, an understanding of the overall performance and function of the system of FIG. 1 will be better facilitated by a brief description of each of the peripheral device stations leaving detail descriptions to the individual figures below. Accordingly, camera station 15 should be understood to include a video camera or camera constructed in accordance with the standard fabrication techniques and having the capability to produce a video signal or signals for the images they perceive. In accordance with an important aspect of the present invention, the cameras and processing systems within camera station 15 are best constructed of the higher resolution video devices presently available in art. In any event, the function of camera station 15 is to provide video information of a perceived scene. Similarly, audio station 19, which may, in some situations, be combined with or closely interrelated with camera station 15, provides conventional audio technology by which the audio portion of the presented scene depiction is converted to appropriate audio signals. Film telecine station 23 comprises a film to high resolution video conversion apperatus constructed in accordance with presently available technologies in which image and audio information stored on conventional film, such as 35 milimeter motion picture film, is converted to high resolution video and audio signals similar in character to those produced by camera station 15.

Recorder station 27 comprises a bilateral storage device in which the image information received from analog LAN 72 may be stored upon high resolution video tape. Conversely, recorder station 27 may be operated to retrieve information stored upon high resolution video tape and convert it to appropriate video signals to be placed upon analog LAN 72. The video signals produced by recorder station 27 are similar in character to those produced by camera station 15.

Display station 31 comprises appropriate systems for receiving the image information on analog LAN 72 and displaying it upon a video display device, such as a CRT or the like. Special effects station 35 comprises system components or selectively receiving information from one or more channels on analog LAN 72 and for processing it in accordance with the special effects to be undertaken and reinserting the specially affected image information onto a available channel on analog LAN 72. In the present example set forth below in greater detail, the special effect exemplified is that of a blue screen process. However, it will be apparent to those skilled in the art that any number of special effect stations can be accommodated which would function substantially in accordance with the overall function of a special effects station.

Lighting station 39 comprises a lighting controller system in which the intensities and positions of a plurality of studio lighting devices are controlled by a common controller. The function of lighting station 39 is to provide a predetermined lighting environment for the studio work and to store and be able to reproduce the lighting environment in the event retakes or additional studio activity at the lighting environment is necessitated. Motion following station 43 comprises the apperatus which provides for the coordination of multiple cameras viewing separate scenes where the eventual object is to combine the images received by the multiple camera into a common image. An example of such a situation is the above described blue screen process where, for example, the background information is provided by filming a miniature model rather than a life-size scene. In such technique, the actors carry forward their activities before a blue screen and the background information is supplied by a separate camera filming the miniature model. The eventual composite is formed by scaling the respective background and foreground inputs to provide appropriate proportion between the foreground objects and the background objects. In such case, the motion of the camera filming the foreground objects or actors performances must be duplicated by the camera filming the background scene information. That is to say if an actor in the foreground filming moves to the right and the camera moves with the actor to display that motion, there must be a corresponding motion of the camera filming the miniature model in the example given. It is the function of motion following station 43 to provide this coordinated or slaved motion of the secondary camera.

Stage effects motion station 47 has a similar function to motion following station 43 but relates instead to coordinating the motion of moveable image objects, such as a cart, an automobile, a door and so on, in the same or similar environment as set forth above for motion following station 43. The function of stage effects motion station 47 is to provide position information in an encoded form suitable for coordinating the motion of image objects or stage objects in the foreground and background filming environments. Mass storage library 51 provides the function of storing the video formatted information and related information in a manner permitting selective retrieval of portion of the image information. The function of mass storage library station 51 is to provide for easy storage and retrieval of image information and, if desired, all associated relevant information.

Digital graphics station 55 provides the capability to digitize analog information received from analog LAN 72 and process it in accordance with digital technology, such as other special effects, and reapply it as analog information to the analog LAN 72. Digital graphics station 55 performs the converse function of receiving digital image information from digital LAN 71 and processing it in accordance with digital techniques for eventual reinsertion to analog LAN 72 or digital LAN 71. Analog to digital protocol conversion stage 59 and digital to analog protocol conversion stage 63 provide similar but reciprocal functions of transferring information between digital format and analog format for transfer of each information between digital LAN 71 and analog LAN 72. Film transfer station 67 provides apperatus which performs the reciprocal function of film telecine station 23 in that it converts the high resolution video format information to a film format.

Finally, master computer 11 comprises a computer with associated memory including a fixed memory which houses a stored program instruction set and a removeable or supplementable memory which is utilized to provide additional information to master computer 11. Master computer 11 further includes a console 73 which provides for operator input to control the various peripheral devices in the studio system. The intent of the system shown in FIG. 1 is to provide substantial flexability in the operation of the present invention studio system and therefore it will be apparent to those skilled in the art that a great number of interrelated functions and processess may be carried forward by the present invention studio system and that the number of permutations of such interrelated functions would render an exhaustive or complete description of all such permutations unduly burdensome and unnecessary to an understanding of the function of the present invention system. Accordingly, the attempt here will be set forth an example or example of operational scenarios intended solely to describe and familiarize with the present invention system. It should be understood however that the descriptions which follow are by no means a description of all possible operational scenarios.

Accordingly, by way of example, a scenario can be postulated in which camera station 15 is filming simultaneously a background scene comprising a miniaturized model and the foreground scene comprising a plurality of performers moving about and interacting upon a blue screen formatted stage. In such blue screen formatted stage all objects intended to be replaced by background scene elements will be colored the appropriate shade of blue to permit their being rendered "invisible" in successive processes. Continuing this example, the video cameras of camera stage 15 under control of master computer 11, would provide output information in the way of image information to analog LAN 72. Master computer 11, during the output of information from camera stage 14, can for example, direct special effect station 35 to receive and process the output image information from camera station 15. Simultaneously, recorder station 27 may be directed by master computer 11 to record the information being produced by camera station 15. It is also possible that film transfer station 67 may be directed at this time by master computer 11 to produce a film conversion or film version of the video information being produced by camera station 15. By way of further example, a copy of the output of camera station 15 may be ordered to be stored for future reference, apart from this filming, by master computer 11 to activate mass storage library 51. In further example, it may be desirable to digitally process the output signal of camera stage 15 for some digital graphics work in which case analog to digital protocol convertor stage 59 may be activated together with digital graphics effects station 55. In other words, the image information available from camera station 15 may be supplied to and processed by a number of peripheral devices simultaneously. Turning now to the control of the studio facility in which camera station 15 is functioning, master computer 11 would typically direct lighting station 39 to set the lighting environment of the stage or stages in which the sequences viewed by the cameras within camera station 15 are operative. As will be described below in greater detail, and in accordance with an important aspect of the present invention system, the computerized control of the lighting systems within lighting station 39 is maintained in accordance with commands provided by master computer 11 and is, through the cooperation of digital LAN 71 and analog LAN 72, coordinated with the image information being processed. In further advantage, and because the lighting system within lighting station 39 is computer controlled, the lighting environment seen by the cameras within camera station 15 is defined by digitally encoded information which in turn facilitates storage of such information and easy reproducability of the identical lighting environment in the event it is desired. In addition to the operation of lighting station 39, the operative environment of cameras within camera station 15 in the hypothetical set forth above, could typically involve the cooperation of motion following station 43 and stage effects motion station 47. As mentioned, the function of motion following station 43 is to coordinate the activity of cameras within camera station 15 which film the various foreground and background scenes which will ultimately be composited into the final film. As also mentioned, motion following station 43 coordinates camera motion and has the capability of providing proportional motion of the cameras within camera station 15 to render a proper perspective on the background information, in this case a miniature model, which will facilitate its combination with the foreground information. In similar manner, the function of stage effects motion station 47 is also corrdinated to the operation of the scenes being perceived by cameras within camera station 15. In accordance with an important aspect of the present invention, the combination of digital LAN 71 and analog LAN 72 permits complete coordination of camera and stage effects motion in a manner uniquely defined and identified as relevant to the image produced by cameras within camera station 15. The means of this unique identification will be set forth below in greater detail. However, suffice it to note here that each image frame produced by cameras within camera station 15 is uniquely defined within the system. Concurrently, each contribution to the image by other peripheral devices within the system is uniquely identified and coordinated to the output of camera station 15. Continuing the scenario example of simultaneous production of foreground and background information using a blue screen process and obtaining the background information from a miniaturized model set, master computer 11 would appropriately at this point provide a command to special effects station 35 to receive the analog information on analog LAN 72 being provided by camera station 15. In the example we have selected, at least two and possibly several camera outputs would be simultaneously applied to analog LAN 72 on different channel frequencies. Corresponding, upon receipt of command, special effects station 35 would begin processing the simultaneous camera signals into form suitable for compositing within the special effects station. In the example of a blue screen process, the function would include combining foreground and background information into a composite of both which provides a completed segment of the entertainment work. At this point, computer 11 might well issue an instruction to special effects station 35 via digital LAN 71 to apply the completed composite output to analog LAN 72 at a defined channel frequency and simultaneously address mass storage library 51 with an instruction to receive the composite scene information and store it for future use. At the same time, if desired, master computer 11 may issue a instruction to film transfer station 67, for example, to receive the composite scene video information from LAN 72 and thereby produce a film conversion of the composite scene information. In addition, master computer 11 may instruct recorder station 27 to also receive and store, in video form, the composite scene information. While either mass storage library 51 or recorder 27 may be used to store a limited amount of scene information, generally mass storage library 51 is adapted to provide archival or long term storage of large amounts of information while recorder station 27 is operative to provide intermediate storage of scene information with the eventual object of producing a video tape of a particular completed work or portion thereof.

By way of further illustration, it may be desirable in a particular portion of the scene being produced in our example to further include various special effects which are produced in a digital environment usng digital electronic technologies. In such case, master computer 11 would instruct digital graphics station 55 to receive the video information on analog LAN 72 produced by special effects station 35 and process it in accordance with a predetermined defined special effects format and reapply the enhanced graphic effects portion digitally produced to a separate channel on analog LAN 72 which may be received, for example, back at special effect station 35 for further compositing or blending with the previously produced image.

The foregoing is merely one example of a specific scenario under which the present invention system would be operated. It will be apparent to those skilled in the art that the number of operative scenarios which can be invisioned using various sequences of the functions of peripheral devices in the system of FIG. 1 is nearly endless. Assuming at this point a composite video information depiction of the entire scene however enhanced and embellished with special effects and so on is produced through the interaction of the peripheral devices of the present invention system and stored in a video tape form within recorder station 27, it may be desirable now to once again view the entire composite scene as produced by all the various devices within the system. Turning attention now to display station 31, which as mentioned, includes apperatus by which the information on analog LAN 72 may, upon computer instruction from master computer 11, be displayed upon a suitable video display device such as a CRT or the like, master computer 11 may now instruct video station 27 to put the composite embellished complete and final version of the video information back onto analog LAN 72. Simultaneously, master computer 11 may instruct display station 31 to receive and process the output information or recorder station 27 and thereby permit the completed video rendition to be viewed and evaluated. It should be noted at this point that in accordance with an important aspect of the present invention, the operation of display station 31 is not limited to this reviewing process but is capable upon command from master computer 11 of displaying any selected channel of information on analog LAN 72 in a ongoing or real time basis. By this, it is meant that upon appropriate instruction, master computer 11, display station 31 may display the resulting scene information on a real time basis as it occurs. In other words, as the various cameras within camera station 15 provide their multiple camera outputs to analog LAN 72 and the peripheral devices are functioning to modify, enhance or embellish that information and reinsert the altered version upon another channel of analog LAN 72 and as special effects station 35 is receiving the various components being provided to analog LAN 72 for compositing into a final completed scene depiction upon instruction from master computer 11 the composited output of special effects station 35 may be placed upon a different analog LAN channel and on an ongoing or real time basis received and displayed by display station 31. What this means simply, is that the television or film producer may then view the resultant composited scene as it is actually occurring. The importance of this advantage cannot be over emphasized in that the persons directing the film production, typically the director, may instantly halt the entire sequence in the event the combined completed effect of all scene components, including special effects and graphics, is not that which is desired. Similarly, the ability to evaluate the composited scene in real time completely eliminates any iterative process under which the previous cinematography blue screen processes functioned and the concomatent delay and expenses.

In the event a completed portion of the film production is viewed on display station 31, or elsewhere, and determined to be undesirable and in the event a determination is made that the particular scene depicted must be reshot or retaken, several of the important advantages of the present invention system assume prominence. Continuing with our example in which a blue screen process is utilized to combine the foreground information of actors operative upon a blue screened studio stage and a miniaturized set utilized to produce background information, the decision to reshoot the entire sequence is greatly simplified by the present invention system and proceeds for example as follows. Master computer 11, using the unique identification assigned to each of the frames within the composited information defining the scene, can retrieve the entire information which constituted the depicted scene. This means that the digitally encoded information of lighting station 39 by which the lighting environment under which camera stataion 15 was operative, may be reconstructed by reapplying the same digital information from storage which defined its original lighting environment. Similarly, the motions of objects upon the stage and the motion of cameras within camera station 15 are also digitally defined and stored and can therefore be retrieved and reapplied to reproduce the same motions. In addition to reproducing the exact conditions under which the to be revised scene was produced, the present invention system permits the alteration of any desired scene component by modifying the digital information which defines that scene component. For example, in the event it is determined that a different lighting environment is desirable for the scene before reshooting, master computer 11 operative through console 73 in response to user commands may implement a different lightly environment and substitute it for the previously existing lighting environment. Thereafter, the entire scene may be redone to determine the desirability of the changes made.

In the event a final approved rendition of the scene is achieved, a film copy may be made by instruction from master computer 11 to recorder station 27 to output the final composited video signal of the completed and approved scene onto a selected channel of analog LAN 72. Simultaneously, master computer 11 may instruct film transfer station 67 to receive and process the information on the selected channel and produce a film rendition thereof.

As mentioned, all of the foregoing are simply examples set forth to illustrate several of the functions of the present invention system. It will be apparent to those skilled in the art that numerous additional operative scenarios may be constructed. For example, it may be desirable to provide background information from a already existing film. In such event, the operation of the film telecine station 23 provides a conversion of image information in film format to video format which upon appropriate instruction from master computer 11 can be placed upon analog LAN 72 to be received by the appropriate peripheral devices, for example, special effects station 35. Similarly, it may be desirable to separately augment the audio portion of the depicted scene utilizing previously produced audio information. Such operation is common, for example, when films are shot using dialog in one language and there is a desire to produce a film version in which the performers are depicted as those speaking a different language. This process called "dubbing" may be carried forward in the present invention system by providing the additional audio dialogue to audio station 19 and through the cooperation of the peripheral devices of the present invention system outputing in the audio dialog at the appropriate time and in proper sequence to the performers speaking actions.

Turning now to the individual operations of the various peripheral devices set forth in FIGS. 2 through 16, it should be understood at the outset that the depictions of signal couplings shown in the drawing figures is representative of communication couplings rather than indicative of the actual number of electrical connections. In accordance with conventional block diagram depictions, the various couplings shown between stages or portions of the various stages in the figures of the present invention, more often than not represent multiple conduction paths. However, for clarity, they are depicted as signal flow patterns with the understanding that multiple conductors are included in such signal flow patterns. Similarly, to preserve clarity and for simplification, the various operative portions of the electrical configurations of the systems shown in the drawing FIGS. 1 through 16 which supply operative power, grounding and various other operational interconnections to the depicted stages has been omitted with the understanding that the functional blocks shown in FIGS. 1 through 16 include appropriate conventional electronic circuitry and interconnections to provide the proper operational environment and apperatus. Finally, it will be apparent to those skilled in the art that the individual blocks depicted in FIGS. 1 through 16 may be fabricated using any number of presently available digital electronic and analog electronic systems.

Figure 2:
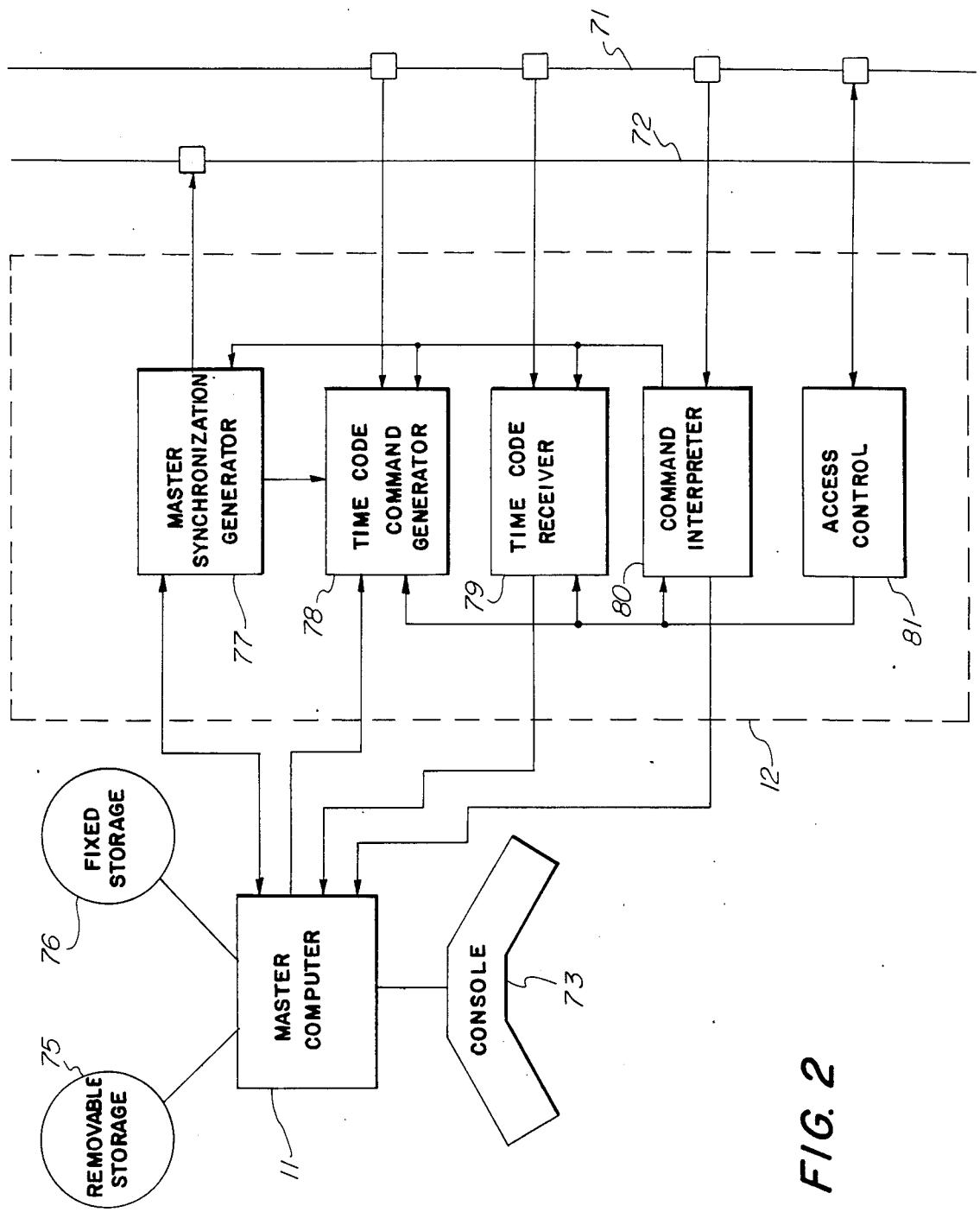
FIG. 2 is a block diagram representation of the master computer control stage of the present invention.

Turning now to FIG. 2 which sets forth master computer control station 11 and console 73, a removeable memory 75 is coupled to master computer 11 and a fixed memory 76 is also coupled to master computer 11. In accordance with well known computer fabrication techniques, master computer 11 includes a stored set of program instructions in fixed storage 76 which are augmented in removeable storage memory 75. The function of console 73 is to provide user inputs and control to master computer 11. In accordance with well known computer techniques, master computer 11 functions in response to inputs from console 73 in accordance with the instructions stored within fixed storage 76 and using data supplied by removeable memory 75, responds to incoming information and provides appropriate output information accordingly. Interface 12 includes a master synchronization generator 77 having an output coupled to analog LAN 72 and a bilateral coupling to master computer 11. A time code and command generator 78 includes a input coupling from master computer 11 and an output coupling to digital LAN 71. Master synchronization generator 77 further includes an output coupling to time code and command generator 78. A time code receiver 79 includes an input coupling to digital LAN 71 and an output coupling to master computer 11. A command interpreter 80 includes an input coupling from digital LAN 71 and an output coupling to master computer 11. An access control 81 includes a bilateral coupling to digital LAN 71 and output couplings to time code generator 78, time code receiver 79 and command interpreter 80. Command interpreter 80 further includes an output coupling to master synchronization generator 77, time code and command generator 78 and time code receiver 79. In operation, master synchronization generator 77 comprises a synch signal producing system which provides synchronization signals for the horizontal scan and vertical scans of the high resolution video system utilized in the present invention. Master synchronization generator 77 is free running and produces its synchronization signals with substantial frequency and phase accuracy to the extent such synchronization signals can function as a reference for the remainder of the video system. The output signals from master synchronization generator which comprise horizontal rate and vertical rate scan synchronization signals not unlike those of conventional lower resolution television systems with the exception of frequency which are coupled to analog LAN 72. Time code and command generator 78 includes means synchronizing to the synch pulse reference signals which provide an augmented time code having information of two digit indications of hours, minutes and seconds of present time as well as frame reference numbers in accordance with the SMPTE time code identifying system as well as coded information defining the date and source identifier which defines the source of each piece of information applied to the LAN. For example, in the event information of a scene content in video form is being applied to analog LAN 72 in accordance with the above described example of blue screen processing, master computer 11, under such circumstances, produced a command to time code and command generator 78 whereby each frame of the video information being placed on analog LAN 72 is uniquely identified by the time of its occurrence as well as the date together with a reference code which identifies the camera station 15 as the source of the information. Thereafter throughout the system and no matter how processed the information placed on analog LAN 72 by camera station 15 is uniquely identified and remains identified by the augmented SMPTE code produced for that information by time code generator 78. Time code receiver 79 provides a reciprocal or converse function to time code generator 78 in that it receives digitally encoded information from digital LAN 71 and interprets the enhanced SMPTE code to identify the particular piece of information to master computer 11. Command interpreter 80 receives digital information from digital LAN 71 and interprets it for use by master computer 11. Access control 81 governs the availability of access to digital LAN 71.

The function of access control 81 is to essentially control the ability of peripheral devices to access the digital LAN 71. In extremely simple systems, access control may be afforded on the basis of availability, much like the system utilized in telephone networking, in which a device attempts access and if the digital LAN is occupied, waits a random interval and attempts access again in an iterative process which continues until access is achieved. This system however is not very desirable for complex systems in which substantial numbers of peripheral devices are coupled to the analog LAN. A preferable system and the one utilized in the present invention system is the above described system of "passing the token" in which access control 81 sequentially or in some other organized manner, provides the opportunity to the various peripheral devices to access the digital LAN. The peripheral devices in turn either respond by transmitting information to the digital LAN, if they have an existing computer command to do so, or "pass" and wait for the next opportunity to gain access to the digital LAN. Whatever system is used, the important point is that access control 81 is operative to organize and control system access to digital LAN 71.

FIG. 4 sets forth a block diagram representation of the elements within audio station 19 and interface 20. A plurality of microphones 90, 91, 92 and 93 are coupled individually to an automated audio console 94. The structure of automated console 94 may be any of the presently available computer controlled automated audio consoles used by practitioners in the art in which the levels of individual microphone input signals and the coupling thereof to the output stages is controlled by an input digital code. Interface 20, shown by dash line representation, includes a channel modulator 95, which in accordance with well known principals in the art, receives an audio frequency signal or signals from audio console 94 and in accordance with well known techniques, modulates the audio signal onto a selected carrier frequency for application to analog LAN 72. A synchronizer 96 which receives an input signal from analog LAN 72 comprising the video synch pulses referred to above, produces a synchronizing signal in response to the received synch pulses which is applied to channel modulator 95 to synchronize or coordinate the time relationship between the audio information being applied to analog LAN 72 and the associated image information synch pulses. Simply stated, the operation of synchronizer 96 and channel modulator 95 provides the timing coordination of sound and image information. A time code and command generator 97, constructed in similar fashion to the above described time code command generators, receives a command signal from audio console 94 and synchronizing pulses from synchronizer 96. The output of time code and command generator 97 is coupled to digital LAN 71 and comprises the time code identifying signal for the audio information being modulated upon a carrier and inserted on analog LAN 72. A command interpreter 98, constructed in accordance with the above described command interpreter, receives information in digital form from digital LAN 71 and interprets the digitized commands embodied therein and when an appropriate digital code is received which indicates a command to the audio station, command interpreter 98 responds by providing the appropriate commands to channel modulator 95, synchronizer 96 and time code and command generator 97 as well as audio console 94. In essence the function of command interpreter 98 is to receive digital coded information from digital LAN 71 on a continuing basis and respond to commands intended for the audio stage and in response thereto, activate the appropriate portions of audio console 94, channel modulator 95, synchronizer 96 and time code and command generator 97 to place the audio information on analog LAN 72 and the time code identifier on digital LAN 71. It will be apparent to those skilled in the art that some or all of the interface unit 20 in audio station 19 may be housed within a common housing and interconnected with the camera station unit structure of camera station 16. This is a matter of design choice and need not effect the spirit and scope of the present invention.

Figure 5:
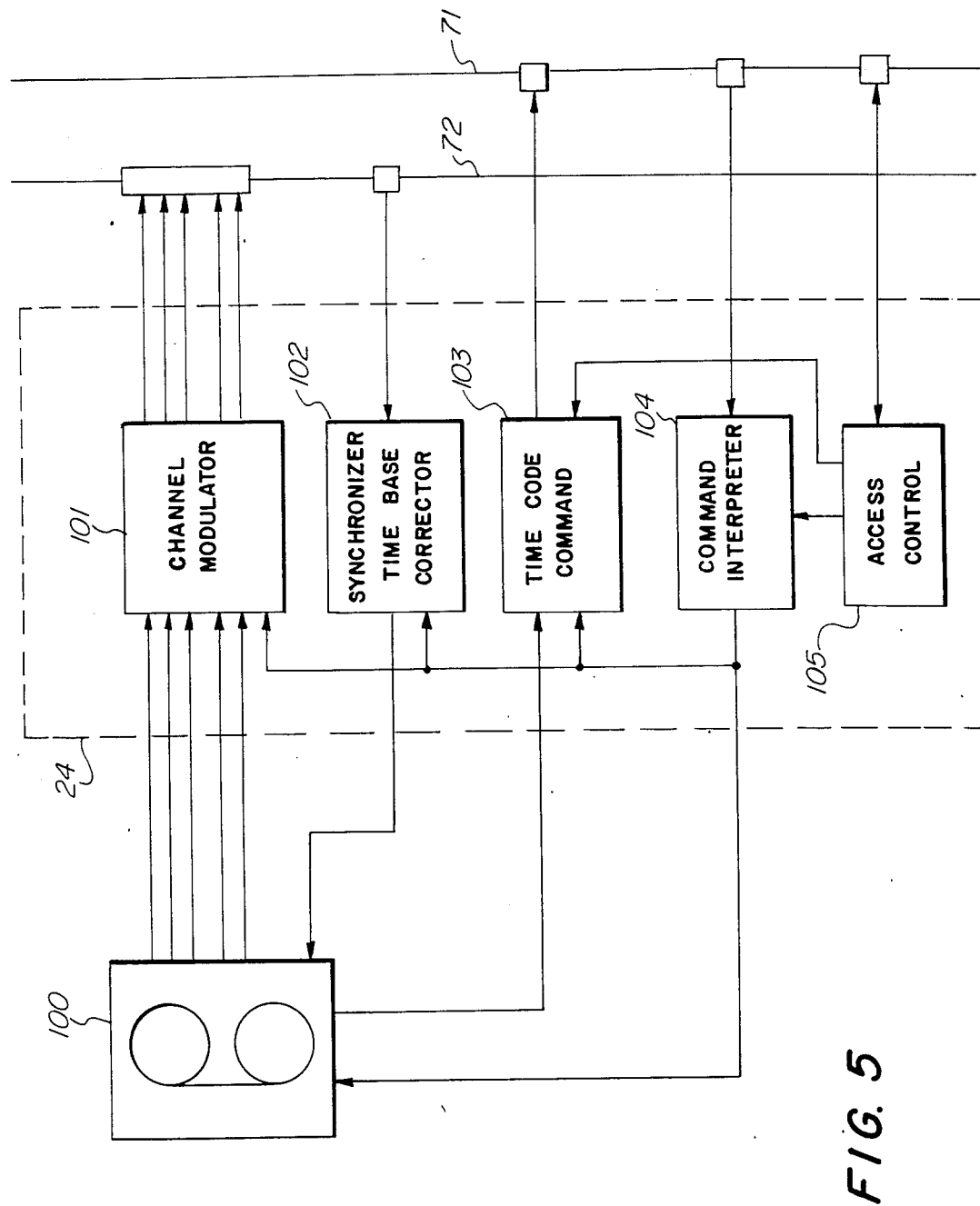
FIG. 5 is a film telecine station constructed in accordance with the present invention.

FIG. 5 shows a block diagram representation of the film telecine station 23 together with interface 24. A film to video convertor 100 which may be constructed using any of the presently available systems for converting 35 millimeter motion picture film to high definition or high resolution video informatiion, is coupled through multiple connections to interface 24. Interface 24 comprises a channel modulator 101 which receives the individual RG & B color video signals from film to video convertor 100 as well as audio information and in accordance with well known construction techniques, modulates the video RGB and audio information onto a selected carrier for application to analog LAN 72. A synchronized time base corrector 102, constructed in accordance with the presently available synchronizing apparatus and similar in construction to synchronizers set forth above for the other device stages, receives synchronizing pulses at the horizontal and vertical scan rates from analog LAN 72 and applies the synch pulses simultaneously to film to video convertor 100 and modulator 101. The result is that the fsynchronizing pulses in the video produced by convertor 100 and the modulated channel information on modulator 101 are coordinated or timed in accordance with the master synchronizing pulses present on analog LAN 72. As will be apparent to those skilled in the art, the object in all of the above described and to be described stations of the present invention system is to coordinate all scan related and image related activities to the master horizontal and vertical scan rate synchronizing signals present on analog LAN 72.

A time code and command generator 103, which is again similar in construction to the above described time code command generators, produces a time, day and date, as well as reference code, augmented SMPTE identifying signal for the information output of channel modulator 101 and provides this time code identifier to digital LAn 71. A command interpreter 104, again, similar in construction to the above described command interpreters, receives the digital command information from digital LAN 71 and in response to the appropriate coded signal identifying activities for the film telecine station outputs a control code to film to video convertor 100 as well as time code and command generator 103, synchronizer 102 and modulator 101 whereby the activities of each is carried forward in response to the control code received by command interpreter 104. An access control 105 which is similar in construction to the above described access controls for other stations within the system is coupled to digital LAN 71 and receives digitally coded information as to the availability of the digital LAN for access by the stages within film telecine station 23.

FIG. 6 shows a block diagram representation of the recorder station 27 and interface 28 constructed in accordance with the present invention. Recorder station 27 includes a multi-channel high definition video and audio recorder 106 constructed in accordance with any of the presently available structures by which video and audio information are stored upon a composite video tape. A time base corrector and signal processing unit 107 provides directional coupling of input and output signals to and from the recorder 106 in response to input control codes derived from interface 28. Time base corrector unit 107 may be constructed in accordance with any of the presently available structures. A channel modulator 108, constructed in accordance with any of the available channel modulation structures, receives RG & B color video signals as well as audio signals from time base corrector 107 and modulates them upon a selected LAN carrier signal for application to analog LAN 72 once the appropriate command signal is received. Conversely, a channel demodulator 109 is coupled to analog LAN 72 and includes conventional structures for demodulating the incoming carrier signal from analog LAN 72 and removing therefrom the individual RG & B color video signals as well as the audio information. The output of channel demodulator 109 is coupled to one input of time base corrector 107. A synchronizer and time base corrector 110 is constructed in a similar manner and functions in a similar manner to the above described synchronizers and time base correctors in the foregoing described stages. Horizontal and vertical rate synch pulses are coupled from analog LAN 72 to synchronizer and time base corrector 110, the output synchronizing pulses upon appropriate command received by synchronizer 110 are coupled to time base corrector 107, channel modulator 108 and channel demodulator 109. The cooperative function of synchronizer time base corrector 110 and time base corrector 107, channel modulator 108 and channel demodulator 109 is to provide synchronization and timing coordination of the video and audio information processed within the recorder station to the master synchronization signals on analog LAN 72. A time code and command generator 111, similar in structure to the above described time code generators, responds to an applied digital code and an input from time base corrector 107 together with an input from synchronizer time base corrector 110 to apply an appropriate augmented SMPTE identifier code to digital LAN 71 which, in accordance with the above described system, uniquely identifies the information output, if any, of channel modulator 108 to analog LAN 72. A command interpreter 112, similar in structure and function to that set forth above in other stations, receives a coded digital input signal from digital LAN 71 and in response to an appropriate code identifying an instruction for recorder station 27, provides an enabling signal to time base corrector 107 and/or selected stages from channel modulator 108, channel demodulator 109, synchronizer time base 110 and time code and command generator 111. An access control 113 receives information from digital LAN 71 and supplies an appropriate activating signal to command interpreter 112 and time code and command generator 111 controlling the application of information by the remaining stages in the recorder station to digital LAN 71 in accordance with the access priorities set forth above.

FIG. 7 sets forth a block diagram representation of display station 31 together with interface 32. Display station 31 comprises a CRT display 114 which receives and responds to input RG & B color video signals as well as audio and synch information to display a video image in accordance with the applied signals. CRT display 114 may, in its simplest form, be a television monitor adapted to higher scan frequency rates characterized by the present high resolution system, or may be any of the presently available high resolution video displays and of course need not necessarily utilize a CRT as the display device but may instead incorporate any of the presently available video display technologies. A channel demodulator 115 is coupled to analog LAN 72 and receives the information modulated signal from the selected channel of analog LAN 72, demodulator 115 is constructed in accordance with any of the presently available channel demodulation devices and selectively demodulates a predetermined channel frequency producing RG & B color video signals together with audio information which is coupled to display 114.

A synchronizer time base corrector 116 functions in accordance with the previously described synchronizer time base correctors and receives synchronizing pulses at horizontal and vertical scan rates from analog LAN 72 and provides reference synchronizing signals to display 114 and channel demodulator 115. Command interpreter 117 and access control 118 are each constructed in accordance with the above described structures and cooperate to receive appropriately coded digital information from digital LAN 71 and, in response to a predetermne station identifying code, activate the devices within display station 31 to selectively process the received information. It should be noted that display station 31 is essentially passive in that it does not put information on either digital LAN 71 or analog LAN 72.

FIG. 8 sets forth a block diagram representation of special effects station 35 and interface 36. Special effects station 35 includes a compositor 119 constructed in accordance with well known fabrication techniques, which, in accordance with convention blue screen structures receives two individual input video signals representing foreground and background image information and in response to appropriate timing and synchronizing commands, provides a composite or combined output signal representing the combination of foreground and background information in accordance with the above described blue screen process. A channel demodulator 120 and a channel demodulator 121, each constructed in a similar fashion and each similar to the above described demodulators, provides a coupling of the modulated RG & B information on analog LAN 72 and couples the individual modulating signals to compositor 119. A channel modulator 122 receives the composite RGB video signals together with appropriate synchronizing signals and remodulates the composited signal upon a selected carrier for application to analog LAN 72. A synchronizer and time base corrector 123 and a time code generator 124 cooperate with a command interpreter 125 and an access control 126, all constructed in accordance with the structures set forth and all functioning in the same manner as described for the above stations, are operative to synchronize the operation of demodulators 120 and 121, modulator 122 and compositor 119 to the master horizontal and vertical rate synchronizing pulse signals on analog LAN 72. Access control 126 provides an enabling signal to channel demodulators 120 and 121 or channel modulator 122 when digital LAN 71 is available to transmit information. Command interpreter 125, in accordance with its function described for other stations, receives digitally coded information from digital LAN 71 and upon receipt of the appropriate identifying command, interprets the information requirements to special effects station 35 and institutes appropriate activating commands.

FIG. 9 shows a block diagram representation of lighting station 39 and interface 40 in which a plurality of studio lights 127 through 132 are coupled to a computer controlled light controller 133. Controller 133 is constructed in accordance with any of the presently available construction techniques in which the intensities and activities of lights 127 through 132 are controlled by controller 133 in response to an input series of digital commands. In addition, controller 133, in accordance with convention electro mechanical techniques, responds to location codes in digitally encoded information to provide the positioning of studio lights 127 through 132. In its simplest form, light controller 133 may be a simple intensity controller multiplex to each of studio lights 127 through 132. In its more complex form controller 133 will include cooperative motor drive mechanisms in which the physical location of lights 127 through 132 are controlled. In either event, suffice it to say that the configuration, however complex, or studio lights 127 through 132, is uniquely identified by an applied digital coded signal applied to light controller 133. Interface 40 includes a synchronizer 134 which in similarity to the above described synchronizers, receives the horizontal and vertical rate synchronizing signals from analog LAN 72 and applies them to light controller 133 and time code and command generator 135. A combination of a time code generator 135, a command interpreter 137 and an access control 138, all constructed with the above described time code generators, command interpreters and access conrols, control the activity and operation of light controller 133 in response to digitally coded signals received from digital LAN 71.

Figure 10:
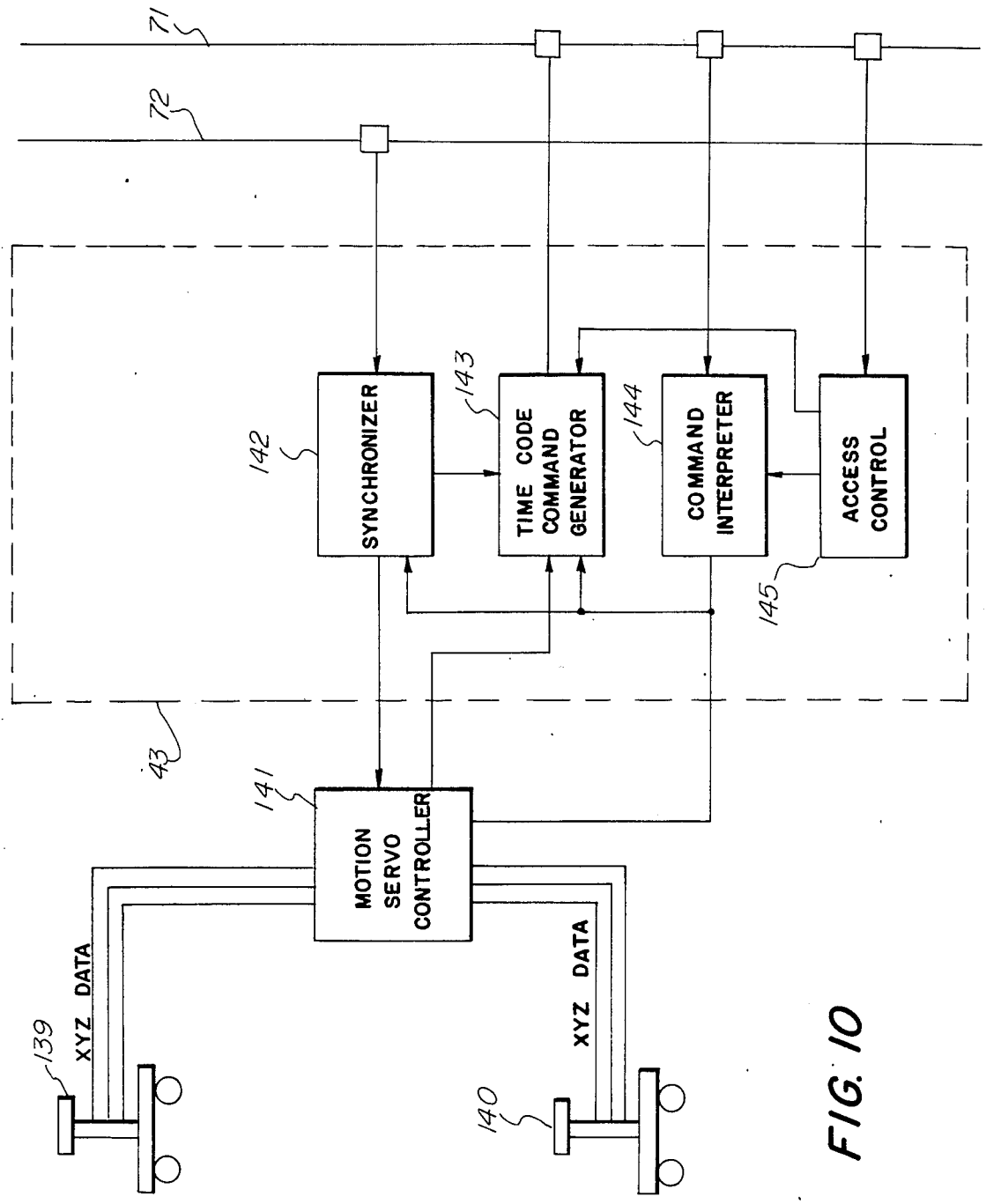
FIG. 10 is a block diagram representation of a motion following station constructed in accordance with the present invention.

FIG. 10 is a block diagram representation of a motion following station, constructed in accordance with the present invention, motion following station 43 includes a pair of motion following camera stands 139 and 140, each coupled to a motion servo controller 141. Motion following camera stands 139 and 140 comprise the presently available power moveable camera stands utilized in the present art which are configured to move in accordance with three dimensional direction data applied to the camera stands in digitally encoded form or to generate digital position codes to the controller if the camera stand is moved manually. Motion servo controller 141 provides a set of output position signals in each of the three dimensions to each of the camera stands as well as accept the input of position codes. The cooperation of camera stands 139 and 140 and motion servo controller 141 results in the unique positioning and configuring of camera stands 139 and 140 in response to digitally encoded position signals applied to motion servo controller 141. In addition, motion control 141 includes the capability to provide a scaling or proportionality factor by which the resulting motions of camera stands 139 and 140 are controlled to compensate for differences in the scale of each depicted image. For example, in the above described process in which simultaneous filming of live performers for foreground information and the background information derivation from a scaled miniature set was undertaken, the proportionate movement of the cameras for foreground and background information and the coordination thereof described above, is achieved by this scaling factor in motion controller 14. Interface 43 includes a syncrhonizer 142 constructed in accordance with the above described synchronizers which receives reference horizontal and vertical rate synch pulses from analog LAN 72 and applies them to motion controller 141 to time synchronize the activities of motion controller 141 to the remainder of the system. A time code and command generator 143, a command interpreter 144 and an access control 145 are all constructed in accordance with and function in accordance with the above described time code command generators, code interpreters and access controllers. Specifically, time code and command generator 143 provides the enhanced SMPTE time code identifier for the scene depiction activities of camera stands 139 and 140 to digital LAN 71. Access control 145 coordinates the output of information from time code generator 143 to availability of digital LAN 71. Command interpreter 144 receives digitally coded information from digital LAN 71 and upon receipt of a station identifier code appropriate to motion following station 43, undertakes appropriate commands to the remaining devices within the motion following station.

Figure 11:
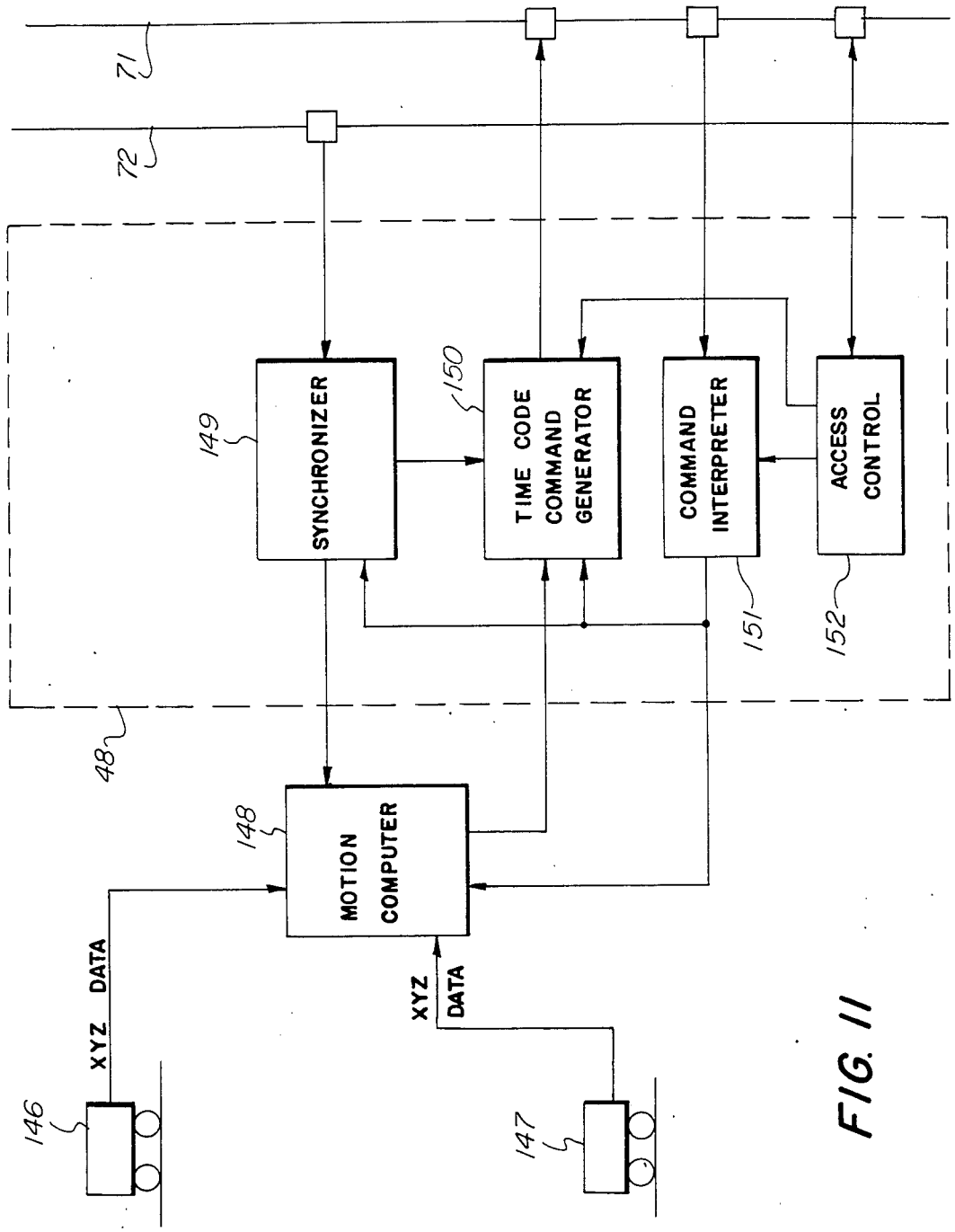
FIG. 11 is a block diagram representation of a stage effects motion station constructed in accordance with the present invention.

FIG. 11 shows a block diagram representation of stage effects motion station 47 and its interface 48 constructed in accordance with the present invention. As will be apparent to those skilled in the art, stage effects motion station 47 is identical in structure with the above described motion following station 43 and interface 44. With the difference that a pair of stage objects 146 and 147 are substituted for the camera stands 139 and 140 of the motion following station. With the exception of this difference, the function of motion controller 148 and synchronizer 149, time code and command generator 150, command interpreter 151 and access control 152 is essentially the same as that described above for motion following station 43 and interface 44 and need not be described further here.

Figure 12:
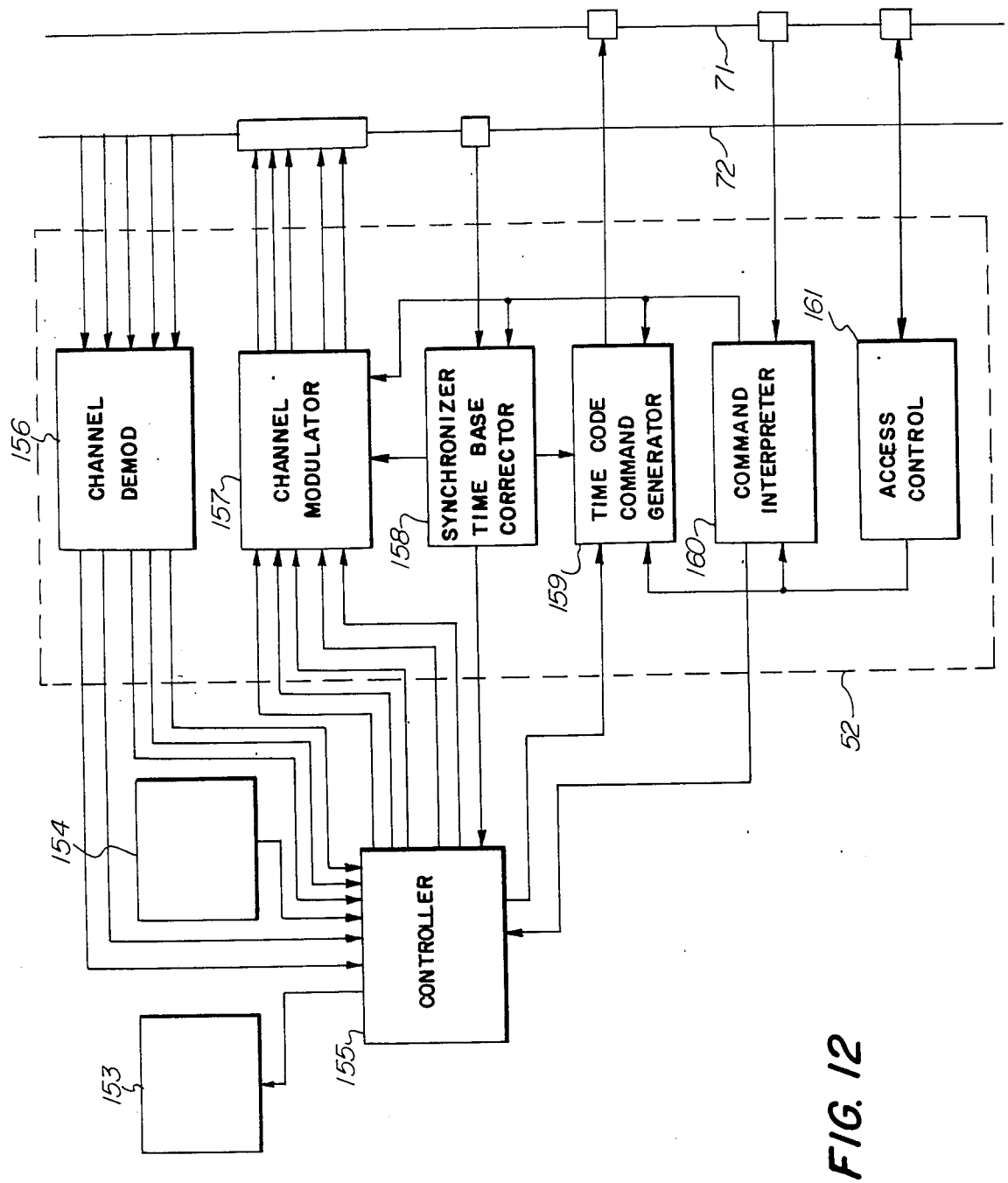
FIG. 12 is a block diagram representation of a mass storage library station constructed in accordance with the present invention.

FIG. 12 shows a block diagram representation of a mass storage library station 51 and interface 52 thereof constructed in accordance with the present invention. Mass storage library 51 comprises a pair of optical disc high resolution video storage units 153 and 154 which may be constructed using any of the presently available video storage techniques. It will also be apparent to those skilled in the art that storage units 153 and 154 may also be replaced by other storage devices such as tape or the like without departing from the spirit and scope of the present invention. A controller 155 is constructed in accordance with presently available technologies and provides for a system of addressing, storing and retrieval of incoming video and information to and from storage discs 153 and 154. A channel demodulator 156 and a channel modulator 157 each constructed in accordance with present technology, provide for the removal from and application to analog LAN 72 of the RG&B video signals together with audio information. A synchronizer time base corrector 158 constructed in accordance with the above described systems provides a source of reference horizontal and vertical rate synchronizing signals to channel modulator 157, channel demodulator 156 and storage controller 155. A time code and command generator 159, a command interpreter 160 and an access control 161 are each constructed in accordance with and function in accordance with the above described stations and need not be further described here except to point out that access control 161 provides control of application of information to digital LAN 71 in accordance with the established access priorities of the system.

Figure 13:
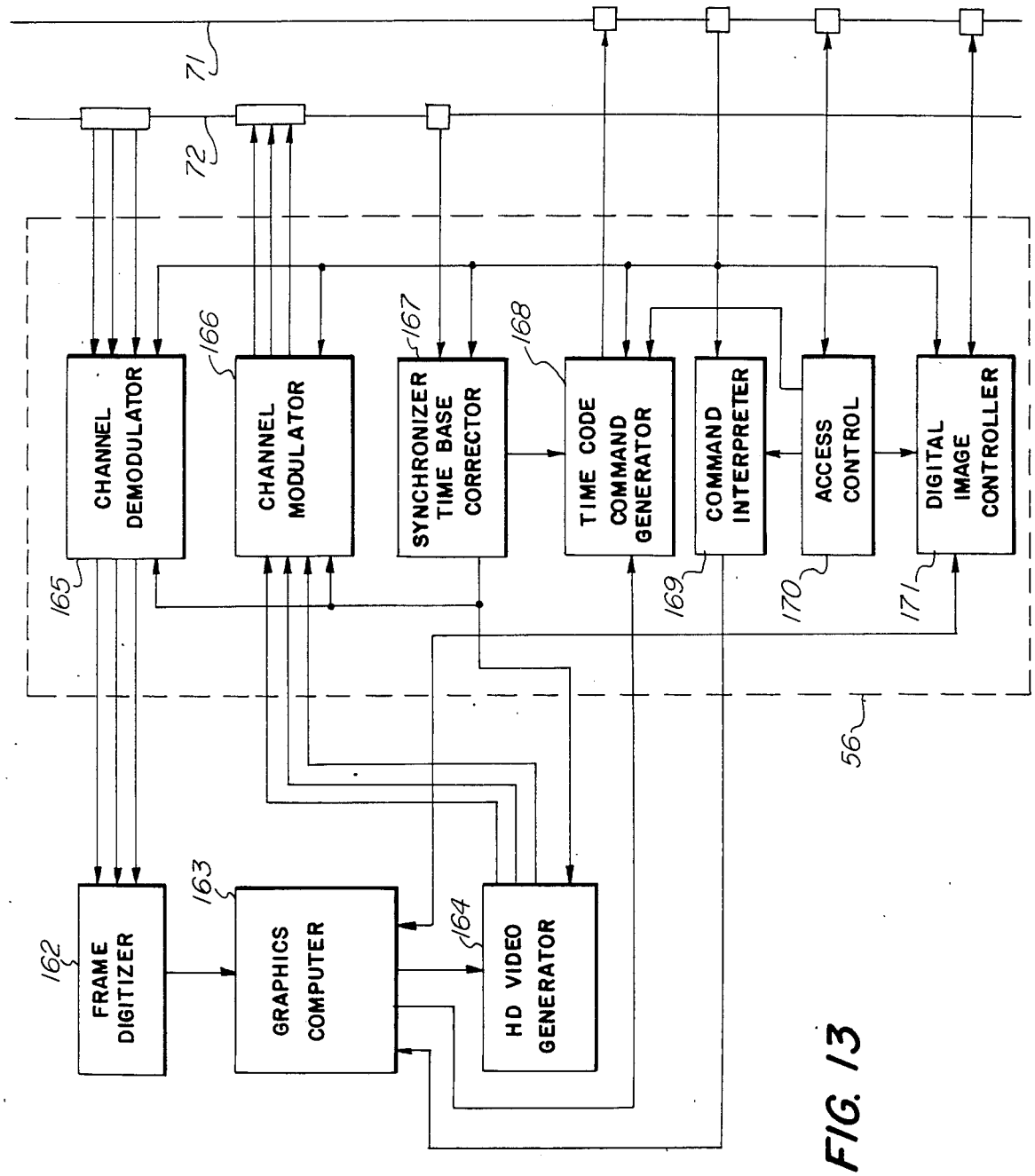
FIG. 13 is a block diagram representation of a digital graphics station constructed in accordance with the present invention.

FIG. 13 shows a block diagram representation of digital graphics station 55 and interface 56 constructed in accordance with the present invention. Digital graphics station 55 comprises a graphics computer 163, constructed in accordance with the present invention, which includes systems utilized in accordance with digital graphics techniques for applying a modifying set of criterias to digital information applied to the graphics computer. A frame digitizer 162 receives RG&B color video information in analog form and coverts it to a corresponding digitally encoded series of signals. Frame digitizer 162 may be constructed in accordance with the presently available technologies referred to as "frame grabbers" or any similar functional unit. A high resolution video generator 164 provides, in accordance with presently available technologies, for the conversion of a inputted digital information code from graphics computer 163 defining an enhanced or augmented image to a analog set of RG&B color video signals suitable for modulation upon a carrier and reapplication to analog LAN 72. A channel demodulator 165, channel modulator 166, a synchronizer time base corrector 167, a time code and command generator 168, a command interpreter 169 and an access control 170 are each configured within interface 56 in the same configuration and function as interface 52 of mass storage library 51 and need not be described further except to point out that the respective RG&B signals produced by channel demodulator 165 form the basic information input to frame digitizer 162, within frame digitizer 162 the conversion to digital information takes place producing a digital rendition of the information in a given frame of the image. Graphics computer 163 receiving the digitized version of the information augments it in accordance with a predetermined graphic affect and produces a digitized version of the augmented image information. Video generator 164 then produces a corresponding set of analog RG&B color video signals which are applied to channel modulator 166 for reinsertion to analog LAN 72. In addition, digital graphics station 55 further includes a digital image controller 171 which is operative in response an encoded command from master computer 11 to receive digital image information from or apply digital information to digital LAN 71.

Figure 14:
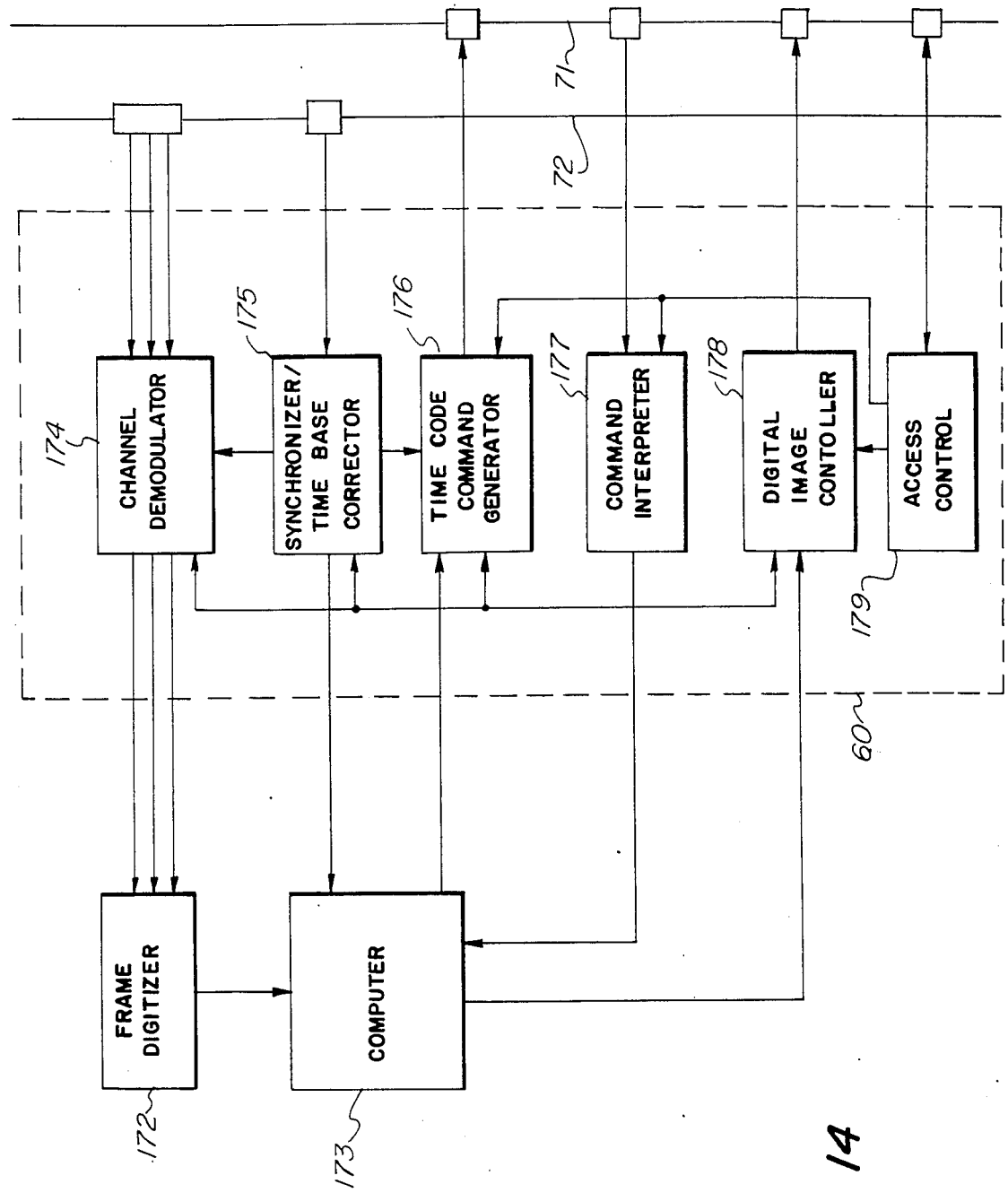
FIG. 14 is a block diagram representation of a analog to digital protocol conversion station constructed in accordance with the present invention.

FIG. 14 sets forth a block diagram representation of an analog to digital protocol conversion station constructed in accordance with the present invention and referenced by numeral 59 above together with it interface 60. Protocol conversion station 59 includes a frame digitizer 172 constructed in a similar fashion to that set forth above in conjunction with FIG. 13 and characterized in the art as a "frame grabber" together with a computer 173. Computer 173 includes a stored set of instructions by which it receives the inputted digitized version of image information produced by frame digitizer 172 and performs the functions necessary to format the digital information from digitizer 172 in an appropriate form for application to digital LAN 71. Interface 60 includes a channel demodulator 174, a synchronizer time base corrector 175, a time code and command generator 176 and a command interpreter 177 together with an access control 179 all configured and constructed in accordance with the foregoing described units of the same name. In addition, interface 60 includes a digital image controller 178 constructed in a similar manner to digital image controller 171 of digital graphics station 55 which responds to access control 179 to selectively apply a digitized version of the image information received from computer 173 to digital LAN 71.

Figure 15:
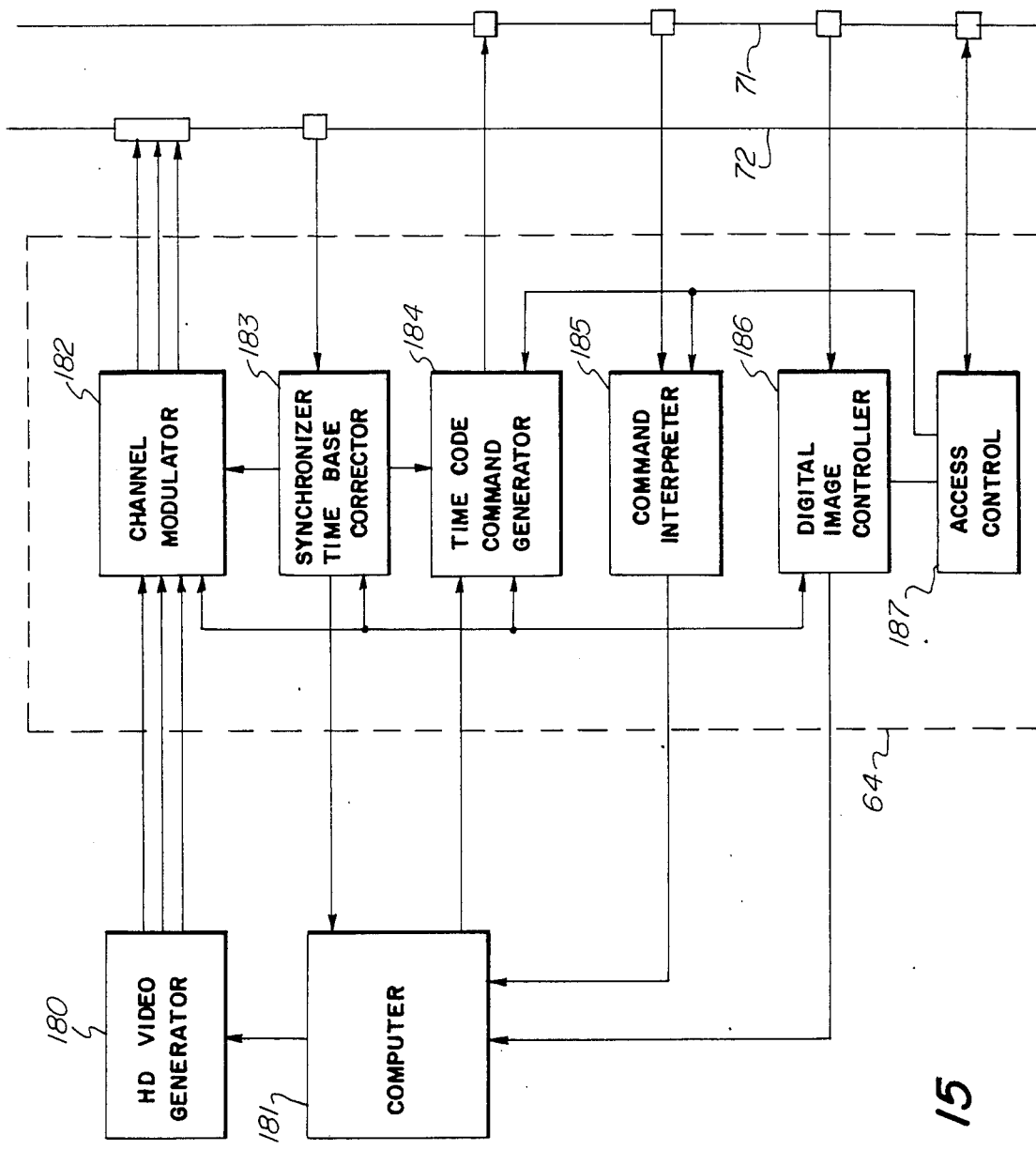
FIG. 15 is a block diagram representation of a digital to analog protocol conversion station constructed in accordance with the present invention.

FIG. 15 sets forth a digital to analog protocol conversion station 63 together with interface 64 constructed in accordance with the present invention. The function of protocol convertor 63 is essentially the converse of protocol convertor 59 in that it receives a digitized version of image information from digital LAN 71 and coverts it to a corresponding analog set of RGB color video signals which are then modulated upon a selected carrier and applied to analog LAN 72. A computer 181 includes a stored set of instructions under which it formats a received digitized version of an image signal to an appropriate set of digitally encoded signals suitable for conversion by video generator 180 to analog RG&B color video signals. The output of video generator 180 is applied to a channel modulator 182 within interface 64. Interface 64 includes a channel modulator 182, a synchronizer time base corrector 183, a time code generator 184, a command interpreter 185, a digital image controller 186 and an access control 187 all constructed in accordance with the above described structures set forth for the remaining stations of the present invention system. Specifically, channel modulator 182 applies the inputted RGB color video signals to an appropriate carrier signal for insertion to analog LAN 72. Syncrhonizer time base corrector 183 provides a source of horizontal and vertical rate synchronizing signals to properly time the actions of channel modulator 182 and computer 181 in accordance with the master synchronizing signals of the system. Access control 187, time code generator 184 and command interpreter 185 function in the similar manner to that set forth above for other stages of the system. Digital image controller 186 receives a digitized version of the image information from digital LAN 71 and applies it to computer 181.

Figure 16:
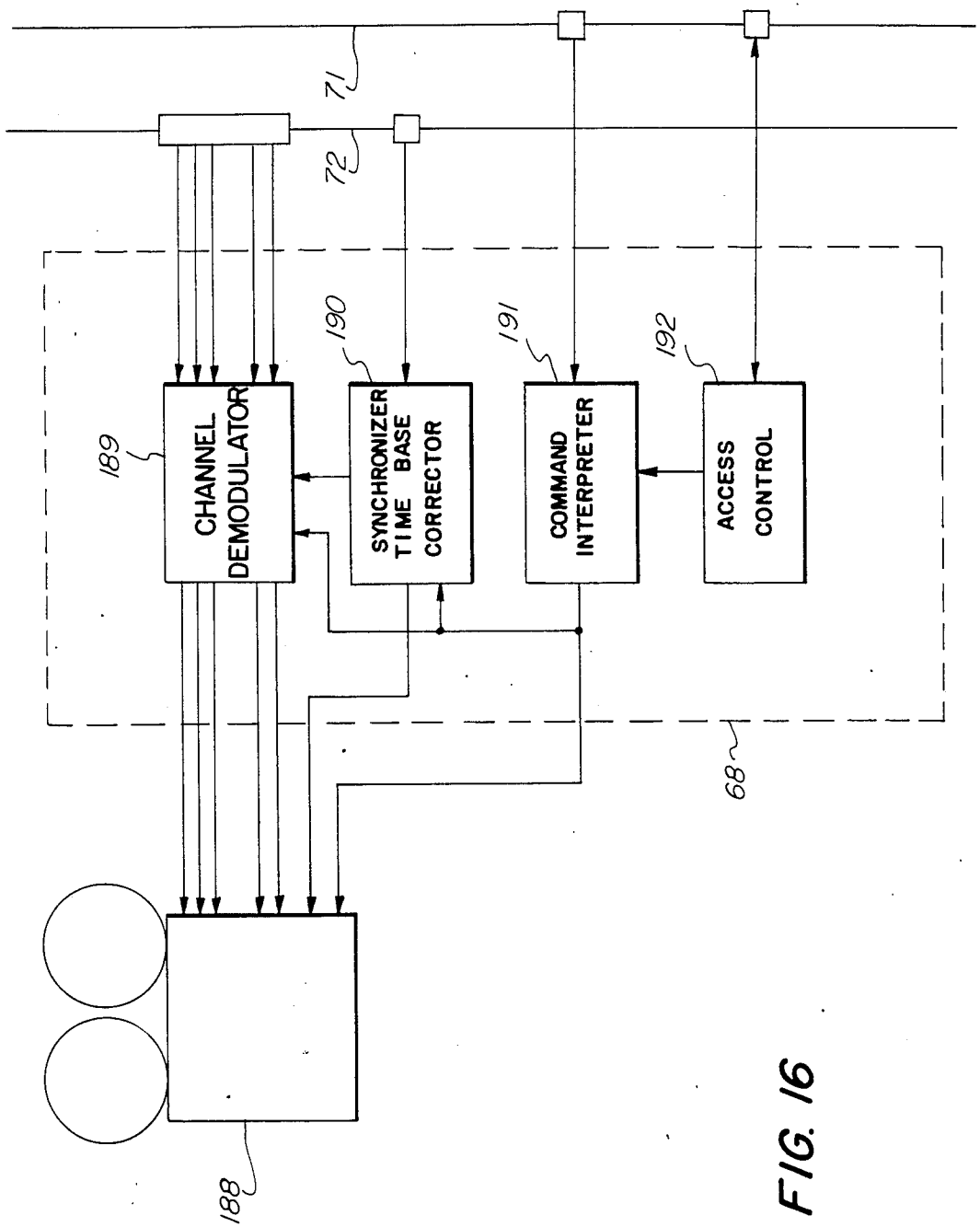
FIG. 16 is a block diagram representation of a film transfer station constructed in accordance with the present invention.

FIG. 16 sets forth a block diagram representation of a film transfer station 67 and its interface 68 constructed in accordance with the present invention. A high resolution video to film transfer device 180 is constructed in accordance with presently available technologies which permit the production of a 35 millimeter or other selected format film having the information input from a high resolution video tape. Interface 68 includes a channel demodulator 189, a synchronizer time base corrector 190, a command interpreter 191 and an access control 192 all constructed in a similar fashion to that set forth above in other stages. Channel demodulator 189 retrieves the respective RG&B color video signals from the modulated carrier received from analog LAN 72 and passes them along together with audio information to film transfer device 188. Within film transfer device 188, the high resolution video RGB signals received from channel demodulator 189 are converted to appropriate images on the film resulting in a formatted film equivalent to the original video information. Synchronizer time base corrector 190, command interpreter 191 and access control 192 are each constructed in accordance with and function in a similar manner to that described above in connection with other stations of the present invention system.

While particular embodiments of the invention have been shown and described, it will be obvious to those skilled in the art that changes and modifications may be made without departing from the invention in its broader aspects, and, therefore, the aim in the appended claims is to cover all such changes and modification as fall within the true spirit and scope of the invention.

What is claimed is:

1. A computerized motion picture film and television studio comprising:
    a video camera producing video information including a plurality of analog image information signals;
    a digital local area network for communicating digitally encoded information;
    an analog local area network for communicating analog information;
    a plurality of information processing devices each having an interface for coupling said information processing devices to said analog local area network and said digital local area network;
    means for assigning unique digitally encoded identification signals for selected portions of said analog image information signals; and computer means controlling the communication of said digitally encoded identification signals between said video camera and said plurality of information processing devices and between said information processing devices via said digital local area network and controlling the communication of said analog image information signals between said video camera and said plurality of information processing devices and between said information processing devices via said analog local area network.

2. A computerized motion picture film and television studio as set forth in claim 1 wherein said analog local area network and said computing means cooperate to create a plurality of frequency separated information channels operable within said analog local area network.

3. A computerized motion picture film and television studio as set forth in claim 2 wherein said analog image information signals are organized in a plurality of image frames and wherein said unique digitally encoded identification signals for analog signals of said video camera and said information processing devices each include digitally encoded signals indicative of the time, date and image frame of the analog image information signal to which they correspond and a source number indicative of the signal source.

4. A computerized motion picture film and television studio as set forth in claim 3 wherein said analog image information signals include a plurality of color video signals and wherein said video camera includes:
 first signal modulation means modulating said color video signals upon a selected carrier signal having a frequency corresponding to a selected one of said information channels.

5. A computerized motion picture film and television studio as set forth in claim 4 wherein said motion picture film and television studio further includes a recorder station coupled to said analog local area network and said digital local area network, said recorder station including:
 first demodulation means for demodulating said color video signals from said selected carrier signal;
 means for recording said color video signals upon video tape;
 second modulation means for modulating said color video signals upon a selected carrier signal for application to said analog local area network; and
 command interpreter means coupled to said digital local area network for receiving a digitally encoded command signal from said computer means and in response thereto causing said color video signals to be transfered to said recorder from said analog local area network via said first demodulation means or from said recorder to said analog local area network via said second modulation means.

6. A computerized motion picture film and television studio as set forth in claim 5 further including a display station having:
 video display means producing a video image in response to applied color video signals;
 second demodulation means coupled to said analog local area network and to said display means; and
 means coupled to said digital local area network and said second demodulation means and said display means for causing said second demodulation means in response to a predetermined digitally encoded instruction from said computing means to receive a selected one of said modulated signals and remove therefrom the corresponding color video signals for display upon said display means.

7. A computerized motion picture film and television studio as set forth in claim 4 wherein said video camera is directed to receive a foreground image and wherein said computerized motion picture film and television studio further includes a second camera directed to receive a background image, said computerized motion picture film and television further including:
 a special effects station having a third and a fourth demodulation means coupled to said analog local area network;
 third modulation means coupled to said analog local area network;
 a compositor having a first video information input coupled to said third demodulation means, a second video input coupled to said fourth demodulation means and a video output coupled to said third modulation means; and
 controller means coupled to said digital local area network responsive to digitally encoded commands from said computer means to cause said compositor to combine said foreground and said background color video information to a composite color video signal for application to said third channel modulator.

8. A computerized motion picture film and television studio as set forth in claim 7 wherein said video camera is directed to a plurality of foreground objects and produces a corresponding set of video foreground information signals and wherein said computerized motion picture film and television studio further includes:
 means for converting images stored upon photographic film to corresponding video information signals, said film images comprising a plurality of background images;
 said special effects station receiving, under control of said computing means, video information for said respective foreground and background images to produce a composite image thereof.

9. A computerized motion picture film and television studio comprising an integrated Local Area Network having at least one channel for the communication of digital information and a plurality of channels for the communication of analog information;
 a plurality of information processing devices including a source of video information signals, said information processing devices each being coupled to said digital channel and said analog channels of said integrated local area network; and
 computing means coupled to said digital information channel and said analog information channels in a communications format in which said computing means causes analog video information to be transferred by and between selected ones of said information processing devices utilizing said digital channel of said integrated local area network to communicate instructions and commands for controlling such information transfer.

10. For use in a motion picture film and television studio, a computerized information processing system comprising:
 a digital local area network for communicating digitally encoded information;
 an analog local area network for communicating analog information;

a source of analog video information signals;

a plurality of information processing devices each having an interface for coupling said information processing devices to said analog local area network and said digital local area network;

means for assigning unique digitally encoded identification signals to selected portions of said analog video information signals; and computing means controlling the communication of said digitally encoded identification signals between said source of video information and said plurality of information processing devices via said digital local area network and controlling the communication of said video information signals between said video camera and said plurality of information processing devices via said analog local area network.

* * * * *

REEXAMINATION CERTIFICATE (2805th)

United States Patent [19]
Efron

[11] B1 4,689,683
[45] Certificate Issued Feb. 27, 1996

[54] COMPUTERIZED STUDIO FOR MOTION PICTURE FILM AND TELEVISION PRODUCTION

[76] Inventor: Edward Efron, 10 Allegheny, Irvine, Calif. 92720

Reexamination Request:
No. 90/003,450, Jun. 6, 1994

Reexamination Certificate for:
Patent No.: 4,689,683
Issued: Aug. 25, 1987
Appl. No.: 840,947
Filed: Mar. 18, 1986

[21] Appl. No.: 840,947
[51] Int. Cl.$^6$ ............... H04N 5/222; H04N 5/262
[52] U.S. Cl. ............... 348/722; 348/705; 370/124
[58] Field of Search ............... 370/71, 124, 73, 370/85.11; 348/571, 6, 578, 584, 598, 722, 705, 12

[56] References Cited

U.S. PATENT DOCUMENTS 3,747,087  7/1973  Harrison, III et al. ............... 345/22
4,549,219  10/1985  Sue et al. ............... 358/405
4,689,683  8/1987  Efron ............... 348/722

OTHER PUBLICATIONS

Microsoft Press, *Computer Dictionary*, 2nd edition, pp. 231–232, 1994.

Harry Newton, *Newton's Telecom Dictionary*, 6th edition, p. 574, Nov. 1994.

*Primary Examiner*—Safet Metjahic

[57] ABSTRACT

A computerized motion picture film and television studio includes a pair of concurrent local area networks. The first local area network communicates digital information and the second communicates analog information over a plurality of assigned channel frequencies. A plurality of information processing devices, including a camera station, transfer video and audio information via the multi-channel analog local area network under the direction of a central control computer.

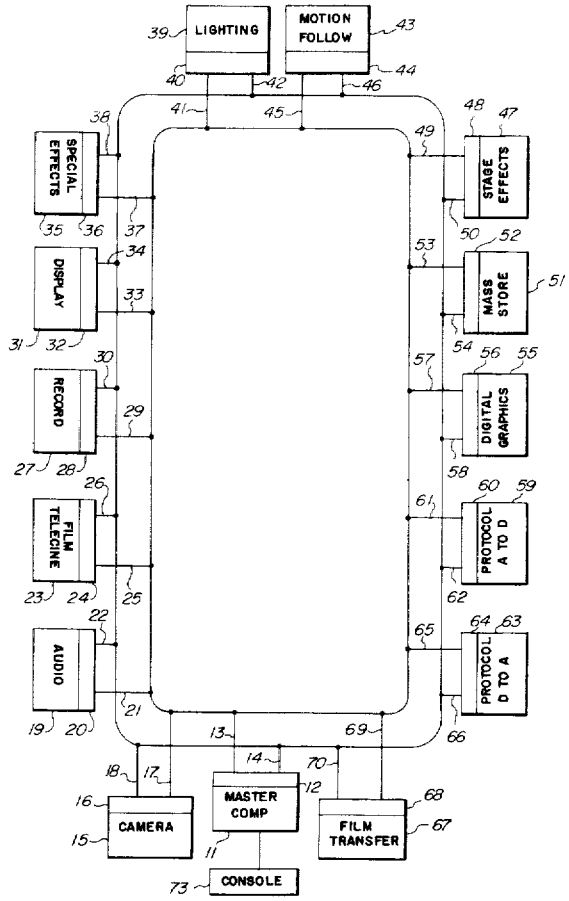

B1 4,689,683

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 and 10 is confirmed.

Claim 9 is determined to be patentable as amended.

New claim 11 is added and determined to be patentable.

9. A computerized motion picture film and television studio comprising an integrated Local Area Network having at least one channel for the communication of digital information and [a] *an analog local area network including a plurality of channels for the communication of analog information;* a plurality of information processing devices including a source of video information signals, said information processing devices each being coupled to said digital channel and said analog channels of said integrated local area network; and computing means coupled to said digital information channel and said analog information channels in a communications format in which said computing means causes analog video information to be transferred by and between selected ones of said information processing devices utilizing said digital channel of said integrated local area network to communicate instructions and commands for controlling such information transfer.

*11. A computerized motion picture film and television studio as set forth in claim 9 wherein said analog local area network and said computing means cooperate to create a plurality of frequency separated information channels operable within said analog local area network.*

* * * * *